United States Patent
Kosaka et al.

(10) Patent No.: US 6,314,217 B1
(45) Date of Patent: Nov. 6, 2001

(54) OPTICAL TRANSMISSION DEVICE AND OPTICAL TRANSMISSION SYSTEM EMPLOYING THE SAME

(75) Inventors: Junya Kosaka, Fujisawa; Takayuki Suzuki; Hiroyuki Nakano, both of Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/663,378

(22) Filed: Sep. 15, 2000

Related U.S. Application Data

(63) Continuation of application No. 09/129,844, filed on Aug. 6, 1998, now Pat. No. 6,195,480.

(30) Foreign Application Priority Data

Aug. 6, 1997 (JP) .............................................. P09-211618

(51) Int. Cl.⁷ ..................................................... G02B 6/28
(52) U.S. Cl. ................. 385/24; 385/20; 385/21; 385/46; 359/114; 359/143; 359/341; 372/6
(58) Field of Search .................. 385/24, 20, 21, 385/46, 31; 359/114, 134, 143, 180, 189, 341, 109, 124; 372/6, 71, 703

(56) References Cited

U.S. PATENT DOCUMENTS

| | | | |
|---|---|---|---|
| 5,375,010 | 12/1994 | Zervas et al. | 372/6 X |
| 5,430,572 | 7/1995 | DiGiovanni et al. | 359/341 |
| 6,195,480 | * 2/2001 | Kosaka et al. | 385/24 |

FOREIGN PATENT DOCUMENTS

| | | |
|---|---|---|
| 05292036 | 11/1993 | (JP) . |
| 7176817 | 7/1995 | (JP) . |
| 07297469 | 11/1995 | (JP) . |
| 7301831 | 11/1995 | (JP) . |
| 08204267 | 8/1996 | (JP) . |
| 8306991 | 11/1996 | (JP) . |
| 09098136 | 4/1997 | (JP) . |
| 09138432 | 5/1997 | (JP) . |
| 10271094 | 10/1998 | (JP) . |

* cited by examiner

*Primary Examiner*—Phan T. H. Palmer
(74) *Attorney, Agent, or Firm*—Antonelli, Terry, Stout & Kraus, LLP

(57) ABSTRACT

An optical transmission device which reduces optical noise in an optical transmission system. The optical transmission device includes a core light amplifying unit, and a first buffer light amplifying unit for amplifying a first signal light from a first transmission path and an amplified second signal light from the core light amplifying unit. The first buffer light amplifying unit supplies the core light amplifying unit with the first signal light, and supplies the first transmission path with the amplified second signal light. Also provided is a second buffer light amplifying unit for amplifying a second signal light from a second transmission path and an amplified first signal light from the core light amplifying unit. The second buffer light amplifying unit supplies the core light amplifying unit with the second signal light, and supplies the second transmission path with the amplified first signal light.

2 Claims, 14 Drawing Sheets

FIG. 8

| INPUT (dBm) | OUTPUT (dBm) | ASE LEVEL (dBm/nm) | GAIN (dB) | NF (dB) |
|---|---|---|---|---|
| -34.98 | -2.40 | -11.54 | 32.58 | 3.90 |
| -33.98 | -1.76 | -11.91 | 32.22 | 3.89 |
| -32.98 | -1.07 | -12.31 | 31.91 | 3.80 |
| -31.98 | -.44 | -12.56 | 31.54 | 3.92 |
| -30.97 | .10 | -13.06 | 31.08 | 3.88 |
| -29.97 | .65 | -13.49 | 30.63 | 3.90 |
| -28.97 | 1.26 | -13.92 | 30.23 | 3.86 |
| -27.97 | 1.89 | -14.36 | 29.86 | 3.79 |
| -26.97 | 2.39 | -14.81 | 29.36 | 3.85 |
| -25.97 | 2.96 | -15.25 | 28.93 | 3.84 |
| -24.97 | 3.52 | -15.71 | 28.49 | 3.82 |
| -23.97 | 3.97 | -16.20 | 27.94 | 3.87 |
| -22.97 | 4.49 | -16.68 | 27.46 | 3.88 |
| -21.97 | 5.00 | -17.17 | 26.97 | 3.88 |
| -20.97 | 5.56 | -17.68 | 26.53 | 3.81 |
| -19.97 | 5.98 | -18.22 | 25.95 | 3.85 |
| -18.97 | 6.41 | -18.73 | 25.39 | 3.90 |
| -17.97 | 6.90 | -19.31 | 24.86 | 3.84 |
| -16.99 | 7.27 | -19.90 | 24.26 | 3.86 |
| -15.99 | 7.71 | -20.49 | 23.69 | 3.83 |
| -14.99 | 8.07 | -21.11 | 23.06 | 3.85 |
| -13.99 | 8.43 | -21.75 | 22.42 | 3.85 |
| -12.99 | 8.75 | -22.41 | 21.74 | 3.87 |
| -11.99 | 9.02 | -23.14 | 21.01 | 3.87 |
| -10.99 | 9.29 | -23.91 | 20.28 | 3.83 |

INPUT VS GAIN & NF TEST

| INPUT (dBm) | OUTPUT (dBm) | ASE LEVEL (dBm/nm) | GAIN (dB) |
|---|---|---|---|
| -34.98 | -24.14 | -33.53 | 10.84 |
| -29.97 | -19.15 | -33.55 | 10.82 |
| -24.97 | -14.05 | -33.50 | 10.92 |
| -19.97 | -9.29 | -33.66 | 10.68 |
| -14.99 | -4.34 | -33.76 | 10.65 |
| -6.40 | 3.98 | -34.77 | 10.38 |

OPTICAL TRANSMISSION DEVICE AND OPTICAL TRANSMISSION SYSTEM EMPLOYING THE SAME

This is a continuation of application Ser. No. 09/129,844 now U.S. Pat. No. 6,195,480 filed Aug. 6, 1998.

BACKGROUND OF THE INVENTION

The present invention relates to an optical transmission device and an optical transmission system. More particularly, the present invention relates to an optical transmission device and an optical transmission system suitable for low-noise transmission.

In an attempt to satisfy a requirement of lowering the cost for an optical transmission system, a wavelength divisional multiplexing optical transmission system, which transmits different wavelengths of signal lights in one single optical transmission fiber, has been considered. In particular, a bi-directional optical transmission system, which transmits different wavelengths of light signals in a single optical transmission fiber bi-directionally, is suitable when exchange of information is needed interactively between the two connected stations. Under such a technical background, it has become more important to provide an optical amplifier applicable to a bi-directional optical transmission system.

Japanese Patent Laid-open No. Hei 6-85369 describes as a conventional apparatus an optical amplifier. The optical amplifier includes apparatus for multiplexing or demultiplexing signal lights in a forward or a reverse direction toward both ends of a doped fiber. The optical amplifier is capable of sharing the use of one optical amplifying medium and one optical pumping source in the forward or the reverse direction, and is applicable to a bi-directional optical transmission system, the constitution of which is simple.

Japanese Patent Laid-open No. Hei 9-98136 describes another example of an optical amplifier which is capable of controlling the individual wavelength output even if there occur variations in signal wavelength multiplexity.

The optical amplifiers disclosed by the above-identified Japanese patent applications have various disadvantages in their practical use as described below. It is generally known that, in a one-directional optical amplifier having one doped fiber, a signal light input loss at a step previous to the doped fiber is attributed to a degradation in the S/N ratio.

"Optical Amplifiers and Their Application" (Ohm Publishing, May, 1992, pp 5-3[1]), describes that it is essential to combine an optical isolator at the front of doped fiber for suppressing reflexed amplified spontaneous emission (ASE). The optical isolator is not the only optical component which is inserted at the front of doped fiber. Generally, a transmission equipment requires a wavelength demultiplexer for an optical surveillance signal, a optical coupler for an optical signal monitor and a wavelength multiplexer for a pumping light. All of these optical components have loses. Further, the noise figure of Erbium doped fiber having a length of 20–30 m is not negligible. Where the noise figure is defined by the ratio of the S/N ratio on the input side and the S/N ratio on the output side.

The optical signal which is attenuated in the transmission path also suffers losses due to the optical components. The optical signal is amplified in the EDF of which a noise figure is large. The above-described transmission equipment cannot achieve a noise figure less than 6 dB.

When a non-regenerative multiple amplifying transmission is performed using k units of optical amplifiers, the S/N ratio degradation amount increases in proportion to the step number k. Accordingly, in an actual optical transmission system in which there exists an upper limit in the total S/N ratio degradation amount, the repeating step number decreases as the S/N ratio degradation amount in the optical amplifiers increases. This eventually shortens the light transmission distance.

For example, when setting optical amplifiers, the S/N ratio degradation amount of same are 4 dB, and the S/N ratio degradation amount of others are 6 dB at intervals of 80 km. Under a requirement that the total S/N ratio deterioration amount can not be more than 12 dB, a total S/N ratio degradation amount of the 4 dB optical amplifiers becomes 12 dB when three steps are repeated, and the total S/N ratio degradation amount of the 6 dB optical amplifiers becomes 12 dB when two steps are repeated. Thus, when the 4 dB optical amplifiers are used in three repeated steps it is possible, thus making it possible to transmit a signal light for 240 km. Whereas, when the 6 dB optical amplifiers are used in two repeated steps it is possible to transmit a signal light for 160 km.

SUMMARY OF THE INVENTION

A first object of the present invention is to eliminate the above-described inconvenience as well as to provide an optical transmission device which is applicable to the low-noise optical transmission system and is, suppressing a degradation of the S/N ratio, suitable for a long haul optical transmission.

A second object of the present invention is to provide a bi-directional optical transmission system suitable for the long distance optical transmission.

In order to solve the above-mentioned problems, a terminal station repeater or an in-line repeater is configured by at least one buffer light amplifying unit in contact with a transmission path and at least one core light amplifying unit in contact with the buffer light amplifying unit. This configuration allows the buffer light amplifying unit to amplify an input signal before a signal light, which has been attenuated because of the propagation along the transmission path, suffers from losses from the optical devices, thereby making it possible to prevent noise degradation in the optical transmission device.

By use of the present invention it is possible to embody an optical transmission device in an optical transmission system, wherein degradation of the S/N ratio is suppressed. Thus, the present invention is suitable for long haul optical transmission. Further, by employing the optical transmission device of the present invention it is possible to develop an optical transmission system suitable for the long distance optical transmission.

The present invention provides an optical transmission device which reduces optical noise in bi-directional transmission systems. The optical transmission device includes a core light amplifying unit and a first buffer light amplifying unit for amplifying a first signal light from a first transmission path and an amplified second signal light from the core light amplifying unit. The first buffer light amplifying unit supplies the core light amplifying unit with the first signal light, and supplies the first transmission path with the amplified second signal light. A second buffer light amplifying unit is provided for amplifying a second signal light from a second transmission path and an amplified first signal light from the core light amplifying unit. The second buffer light amplifying unit supplies the core light amplifying unit with the second signal light, and supplies the second transmission path with the amplified first signal light.

The core light amplifying unit includes a first optical multiplexer/demultiplexer, a second optical multiplexer/demultiplexer, a first optical amplifier for amplifying the first signal light from the first optical multiplexer/demultiplexer so as to send out the amplified first signal light to the second optical multiplexer/demultiplexer, and a second optical amplifier for amplifying the second signal light from the second optical multiplexer/demultiplexer so as to send out the amplified second signal light to the first optical multiplexer/demultiplexer.

BRIEF DESCRIPTION OF THE DRAWINGS

The scope of the present invention will be apparent from the following detailed description, when taken in conjunction with the accompanying drawings, and such detailed description and specific examples, while indicating preferred embodiments of the invention, are given by way of illustration only, since various changes and modifications within the spirit and scope of the invention will become apparent to those skilled in the art from this detailed description, in which:

FIG. 8 is a diagram illustrating an experimental result obtained by using an embodiment of a terminal station repeater according to the present invention;

DESCRIPTION OF THE PREFERRED EMBODIMENTS

Various modes for carrying out the present invention will be described below using the figures.

Figure 1:
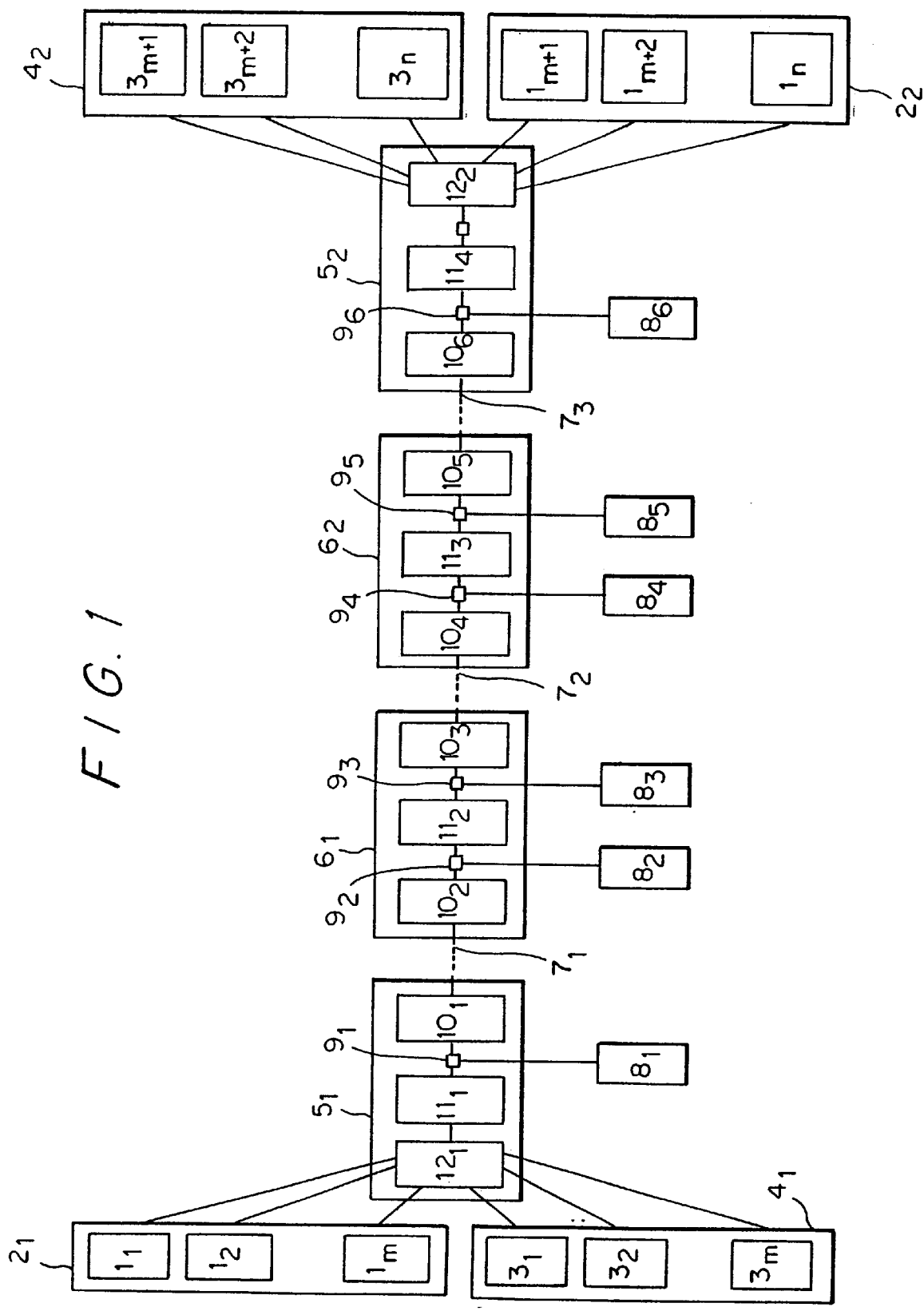
FIG. 1 is a basic function block diagram illustrating an embodiment of a bi-directional optical transmission system according to the present invention.

FIG. 1 is a basic function block diagram illustrating an embodiment of an optical transmission system according to a first mode for carrying out the present invention. The optical transmission system includes optical transmitting units 2 including a plurality of optical transmitters 1, optical receiving units 4 including a plurality of optical receivers 3, and terminal station repeaters 5. Also, the terminal station repeaters 5 are connected with intermediate repeaters 6 through at least one transmission path 7. This configuration allows a signal light to be transmitted bi-directionally from an optical transmitting unit 2, to an optical receiving unit $4_2$, or from an optical transmitting unit $2_2$ to an optical receiving unit $4_1$.

A line state of the transmission path 7 is supervised in the following a manner: a supervisory light signal introduced by a supervisory unit 8 is introduced into a transmission path by a supervisory light signal multiplexer/demultiplexer 9, and in a next terminal station repeater or intermediate repeater, a supervisory light signal launched out from a supervisory light signal multiplexer/demultiplexer 9 is introduced into a supervisory unit 8, thereby monitoring the line state of the transmission path. However, the supervisory units are not essential, and even if they are removed, there are no adverse influence or effects on the present invention.

A transmission path $7_1$ is connected with buffer light amplifying units $10_1$, at least one of which is set within a terminal station repeater $5_1$. The buffer light amplifying units $10_1$ are connected through a supervisory light signal multiplexer/demultiplexer $9_1$ with core light amplifying units $11_1$, at least one of which is set within the terminal station repeater $5_1$. Further, the core light amplifying units $11_1$ are connected with an optical multiplexer/demultiplexer $12_1$, and at least one optical transmitter 1 and optical receiver 3. A terminal station repeater $5_2$ is configured in much the same way.

A transmission path $7_1$ or $7_2$ is connected with buffer light amplifying units $10_2$ or $10_3$, at least one of which is respectively set within an intermediate repeater $6_1$. The buffer light amplifying units $10_2$ or $10_3$ are connected through a supervisory light signal multiplexer/demultiplexer $9_2$ or $9_3$ with core light amplifying units $11_2$, at least one of which is set within the intermediate repeater $6_1$. An intermediate repeater $6_2$ is configured in much the same way.

In the present transmission system, an arbitrary number of intermediate repeaters 6 may be arranged in series. Additionally, in the present configuration, a so-called bi-directional transmission system is assumed, but the similar configuration is also applicable to a unit directional transmission system.

This configuration allows the buffer light amplifying units to amplify an input signal before a signal light, which has been attenuated because of the transmission path loss, suffers from a loss from the optical devices. Thus, the configuration makes it possible to prevent a noise figure degradation in the whole optical transmission device. As a result, it becomes possible to embody an optical transmission system suitable for a long haul optical transmission.

Figure 2:
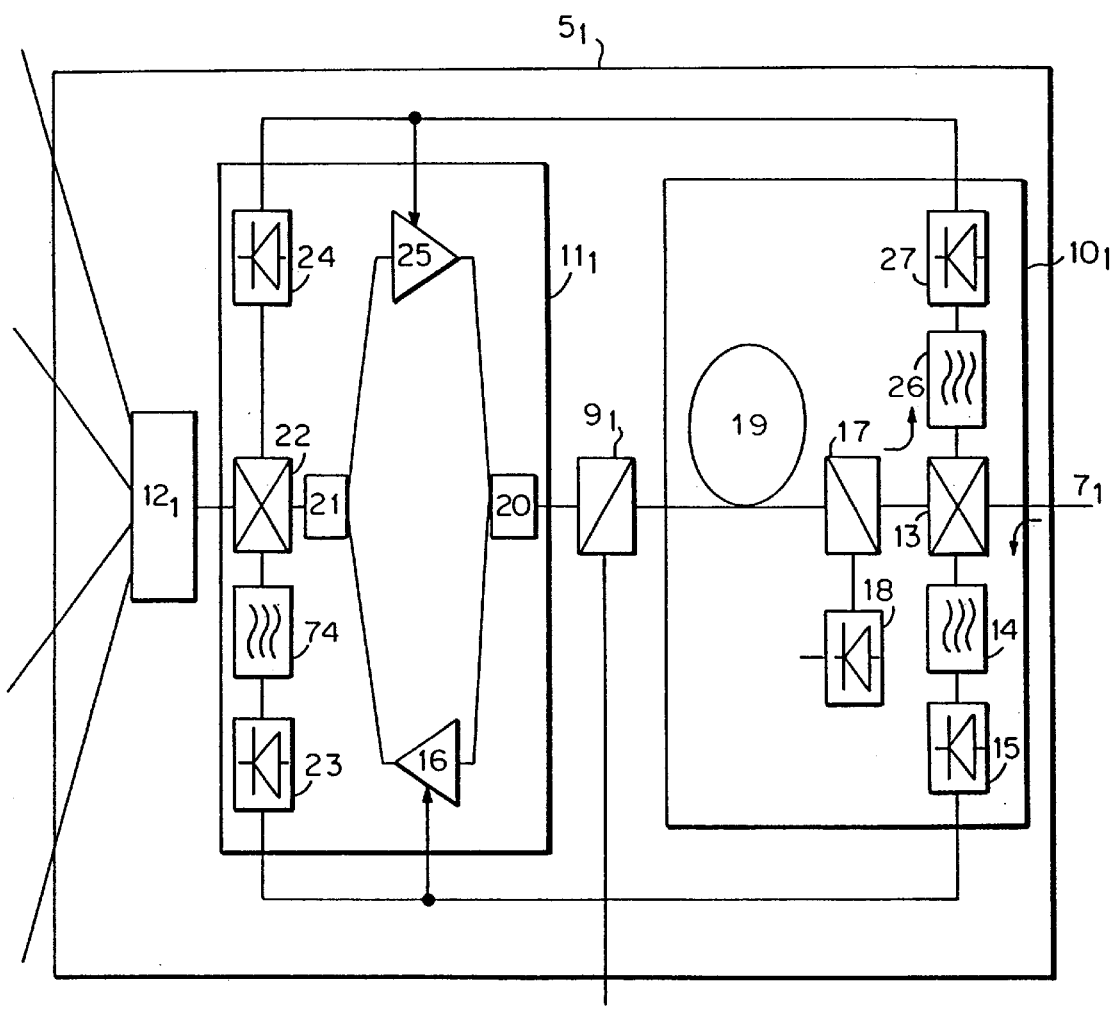
FIG. 2 is a block diagram illustrating functions of an embodiment of a terminal station repeater according to the present invention.

The following description is an embodiment of optical transmission devices according to a second mode for carrying out the present invention as illustrated in FIG. 2. FIG. 2 specifically illustrates the terminal station repeater 5-1, which is one of the components in the bi-directional optical transmission system illustrated in FIG. 1. In FIG. 2, a signal light from the transmission path $7_1$ is introduced into the buffer light amplifying unit $10_1$. A portion of the introduced signal light is branched by an optical coupler 13. A branched signal light passes through an optical filter 14, which removes a supervisory signal light, and is then detected by an optical detector 15. The detected input supervisory signal is transferred to an optical amplifier 16 within the core light amplifying unit $11_1$.

A signal light having passed through the optical coupler 13 is multiplexed by an optical multiplexer 17 together with a pumping light from a pumping light source 18, and is then introduced into a rare earth-doped optical fiber 19. Because the rare earth-doped optical fiber 19 is raised up to be in an excited state by the pumping light, the signal light is amplified. The amplified signal light, passing through the supervisory light signal multiplexer/demultiplexer $9_1$, is introduced into an optical multiplexer/demultiplexer 20 within the core light amplifying unit $11_1$. Then, after the signal light is introduced so as to be further amplified into the optical amplifier 16 by way of the optical multiplexer/demultiplexer 20, a portion of the signal light is branched by an optical coupler 22 through an optical multiplexer/demultiplexer 21. A branched signal light is detected by an optical detector 23, and, as an input supervisory unit signal, is transferred to the optical amplifier 16 within the core light amplifying unit $11_1$. A signal light having passed through the optical coupler 22 reaches the optical multiplexer/demultiplexer $12_1$. In the optical multiplexer/demultiplexer $12_1$, the signal light is demultiplexed at a predetermined wavelength, reaching the optical receiving unit $4_1$ (not illustrated).

Incidentally, the optical couplers 13, 22, the optical detectors 23, 15, and the optical filter 14 are not necessarily situated at these positions. For example, a plurality of them may be set for every transmission path at a step next to the optical amplifier 16, or at a step next to the optical multiplexer/demultiplexer $12_1$.

A signal light in the reverse direction on the side of the optical transmitting unit $2_1$ (not illustrated), after being multiplexed by the optical multiplexer/demultiplexer $12_1$, within the terminal station repeater $5_1$, a portion of the signal light is branched by the optical coupler 22 within the core light amplifying unit $11_1$. A branched signal light is detected by an optical detector 24, and, as an input supervisory unit signal, is transferred to an optical amplifier 25 within the core light amplifying unit $11_1$.

A signal light having passed through the optical coupler 22 is amplified through the optical multiplexer/demultiplexer 21 by the optical amplifier 25. The amplified signal light arrives at the supervisory light signal multiplexer/demultiplexer $9_1$ by way of the optical multiplexer 20. Then, after passing through the supervisory light signal multiplexer/demultiplexer $9_1$, the signal is introduced, so as to be further amplified, into the rare earth-doped optical fiber 19 within the buffer light amplifying unit $10_1$ in a direction opposite to that of the above-mentioned signal light. The amplified signal light passes through the optical multiplexer 17, and then a portion thereof is branched by the optical coupler 13. A branched signal light, passing through an optical filter 26 for removing a supervisory unit signal light, is detected by an optical detector 27, and, as an input supervisory unit signal, is transferred to an optical amplifier 25 within the core light amplifying unit 111. A signal light having passed the optical coupler 13 is configured to be conveyed into the transmission path $7_1$.

Here, the optical coupler 22 and the optical detector 24 are not necessarily situated at these positions. For example, a plurality of them may be set for every transmission path at a step previous to the optical amplifier 25, or at a step previous to the optical multiplexer $12_1$. Also, the optical coupler 13, the optical filter 26, and the optical detector 27 are not necessarily situated at these positions. For example, they may be set at a step next to the optical amplifier 25, at a step previous to the buffer light amplifying unit $10_1$, or at a step previous to the supervisory light signal multiplexer/demultiplexer $9_1$.

Meanwhile, a supervisory light signal on the side of a supervisory light signal source (not illustrated), which is introduced by the supervisory light signal multiplexer/demultiplexer $9_1$ and passing through the buffer light amplifying unit $10_1$, is introduced into the transmission path. Additionally, the optical amplifiers 16, 25 are configured to be controlled by the input supervisory unit signal and the output supervisory unit signal.

In a terminal station repeater based on the conventional apparatus, there exist optical losses caused by optical devices such as the optical multiplexer 20 set at a step previous to the optical amplifier 16, the supervisory light signal multiplexer/demultiplexer $9_1$, and optical isolators set within the optical amplifier 16. The optical losses resulted in a factor of bringing about a noise figure degradation in the whole terminal station repeater. In the present invention, however, the buffer light amplifying unit $10_1$ is configured to amplify an input signal before an attenuated signal light from the transmission path $7_1$ suffers from the losses due to the optical devices. Thus, the present invention makes it possible to prevent the noise figure degradation in the whole terminal station repeater.

At the same time, according to the buffer light amplifying unit $10_1$ in the present configuration, it becomes unnecessary to employ the optical isolators, since the buffer amplifier is of low gain. The optical isolators were essential to an optical amplifier in the conventional apparatus. This makes it possible to prevent a noise figure degradation in the buffer light amplifying unit $10_1$ itself, and eventually makes it possible to prevent the noise figure degradation in the whole terminal station repeater $5_1$.

Figure 3:
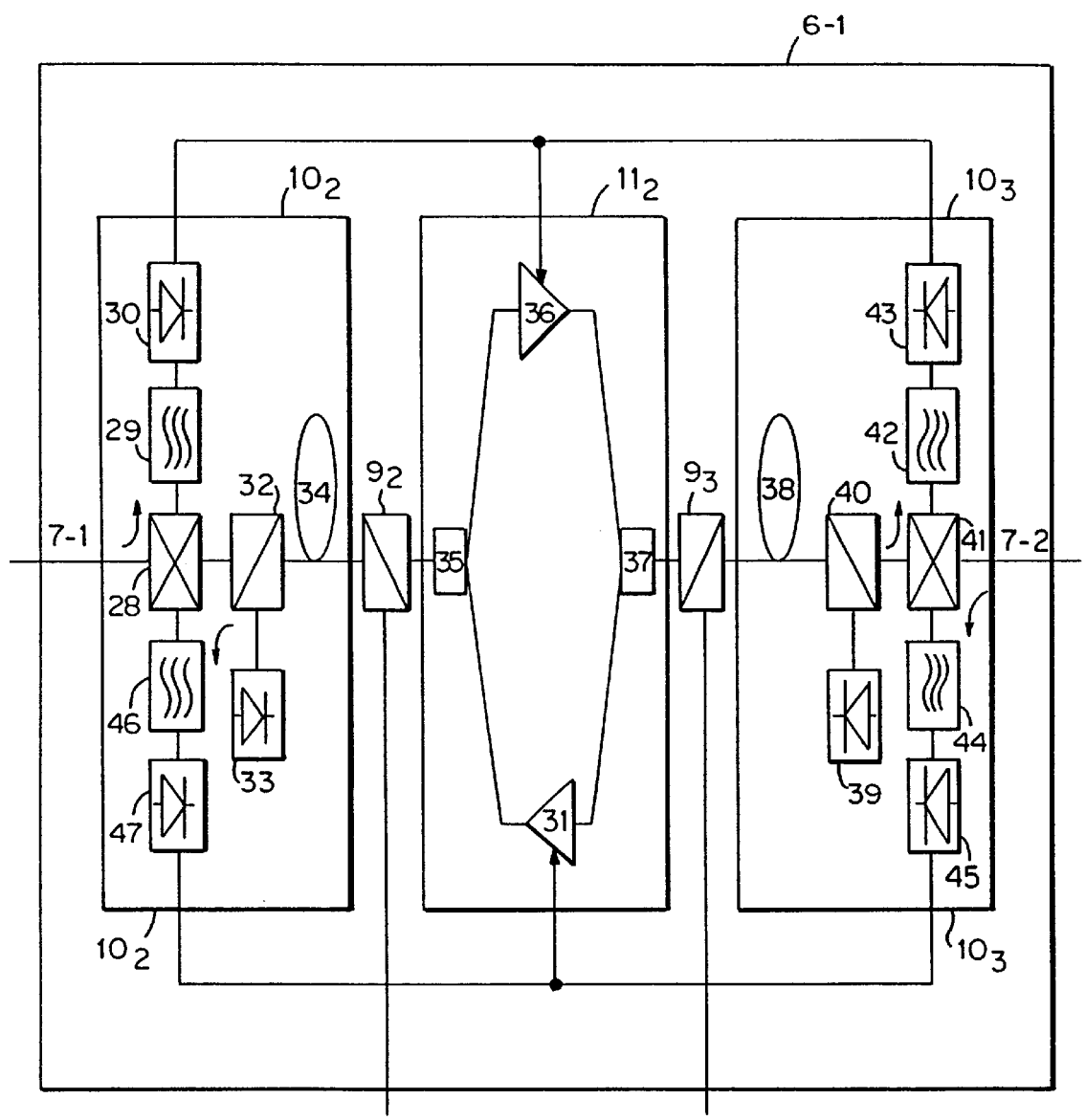
FIG. 3 is a block diagram illustrating functions of an embodiment of an intermediate repeater according to the present invention.

Described below using FIG. 3 is another embodiment of optical transmission devices according to a second mode for carrying out the present invention:

FIG. 3 is a configuration diagram illustrating the intermediate repeater $6_1$, which is one of the components in the bi-directional optical transmission system indicated in FIG. 1. A signal light from the transmission path $7_1$ is introduced into the buffer light amplifying unit $10_2$. A portion of the introduced signal light is branched by an optical coupler 28. A branched signal light passes through an optical filter 29 for removing a supervisory unit signal light, and is then detected by an optical detector 30. The detected input supervisory unit signal is transferred to an optical amplifier 31 within a core light amplifying unit $11_2$.

A signal light having passed through the optical coupler 28 is multiplexed by an optical multiplexer 32 together with a pumping light from a pumping light source 33, and is then introduced into a rare earth-doped optical fiber 34. Because the rare earth-doped optical fiber 34 is raised up to be in an excited state by the pumping light, the signal light is amplified. The amplified signal light, passing through a supervisory light signal multiplexer/demultiplexer $9_2$, is introduced into an optical multiplexer/demultiplexer 35 within the core light amplifying unit $11_2$. Then, after being introduced so as to be further amplified into an optical amplifier 36 by the optical multiplexer/demultiplexer 35, the signal light passes through a supervisory light signal multiplexer/demultiplexer $9_3$ by way of an optical multiplexer/demultiplexer 37 and is introduced into a rare earth-doped optical fiber 38 within a buffer light amplifying unit $10_3$.

The rare earth-doped optical fiber 38, into which an optical multiplexer 40 multiplexes and introduces a pumping light from a pumping light source 39, lies in an excited state. Consequently, the signal light is amplified and, passing through the optical multiplexer 40, a portion thereof is branched by an optical coupler 41. A branched signal light, passing through an optical filter 42 for removing a supervisory unit signal light, is detected by an optical detector 43, and, as an output supervisory unit signal, is transferred into the optical amplifier 36 within the core light amplifying unit $11_2$. A signal light having passed through the optical coupler 41 is conveyed into a transmission path $7_2$.

However, the optical coupler 41, the optical filter 42, and the optical detector 43 are not necessarily situated at these positions. For example, they may be set at a step next to the optical amplifier 36, at a step previous to the buffer light amplifying unit $10_3$, or at a step previous to the supervisory light signal multiplexer/demultiplexer $9_3$.

A signal light in the reverse direction on the side of the transmission path $7_2$ is introduced into a buffer light amplifying unit $10_3$. A portion of the introduced signal light is branched by the optical coupler 41. A branched signal light, passing through an optical filter 44 for removing a supervisory unit signal light, is detected by an optical detector 45. The detected input supervisory unit signal is transferred into the optical amplifier 31 within the core light amplifying unit $11_2$.

A signal light having passed through the optical coupler 41 is multiplexed by the optical multiplexer 40 together with a pumping light from the pumping light source 39, and is then introduced into a rare earth-doped optical fiber 38. Because the rare earth-doped optical fiber 38 is raised up to be in an excited state by the pumping light, the signal light is amplified. The amplified signal light, passing through the supervisory light signal multiplexer/demultiplexer $9_3$, is introduced into an optical multiplexer/demultiplexer 37 within the core light amplifying unit $11_2$. Then, after being introduced so as to be further amplified into an optical amplifier 31 by the optical multiplexer/demultiplexer 37, the signal light passes through the supervisory light signal multiplexer/demultiplexer $9_2$ by way of the optical multiplexer/demultiplexer 35 and is introduced into the rare earth-doped optical fiber 34 within the buffer light amplifying unit $10_2$. The rare earth-doped optical fiber 34, into which an optical multiplexer 32 multiplexes and introduces a pumping light from the pumping light source 33, lies in an excited state. Consequently, the signal light is amplified and, passing through the optical multiplexer 32, a portion thereof is branched by the optical coupler 28. A branched signal light, passing through an optical filter 46 for removing a supervisory unit signal light, is detected by an optical detector 47, and, as an output supervisory unit signal, is transferred into the optical amplifier 31 within the core light amplifying unit $11_2$. A signal light having passed through the optical coupler 28 is conveyed into the transmission path $7_1$.

However, the Optical coupler 28, the optical filter 46, and the optical detector 47 are not necessarily situated at these positions. For example, they may be set at a step next to the optical amplifier 31, at a step previous to the buffer light amplifying unit $10_2$, or at a step previous to the supervisory light signal multiplexer/demultiplexer $9_2$.

Meanwhile, a supervisory light signal on the side of a supervisory light signal source (not illustrated), which is introduced by the supervisory light signal multiplexers/demultiplexers $9_2$, $9_3$ and, passing through the buffer light amplifying units $10_2$, $10_3$, is introduced into the transmission paths $7_1$, $7_2$. In addition, the optical amplifiers 31, 36 are configured to be controlled by the input supervisory unit signal and the output supervisory unit signal.

In a terminal station repeater based on the conventional apparatus, there exist optical losses caused by optical devices such as the optical multiplexers 35, 37 set at a step previous to the optical amplifiers 31, 36, the supervisory light signal multiplexers/demultiplexers $9_2$, $9_3$, and optical isolators set within the optical amplifiers 31, 36. The optical losses resulted in a factor of bringing about a noise figure degradation in the whole terminal station repeater. In the present invention, however, the buffer light amplifying unit $10_2$, or $10_3$ is configured to amplify an input signal before an attenuated signal light from the transmission paths $7_1$, $7_2$ suffers from the losses due to the optical devices, thus making it possible to prevent the noise figure degradation in the whole terminal station repeater.

At the same time, according to the buffer light amplifying units $10_2$, $10_3$ in the present configuration, it becomes unnecessary to employ the optical isolators, which were essential to an optical amplifier in the prior art. This makes it possible to prevent a noise figure degradation in the buffer light amplifying units $10_2$, $10_3$ themselves, too, and eventually makes it possible to prevent the noise figure degradation in the whole terminal station repeater $6_1$.

Figure 4:
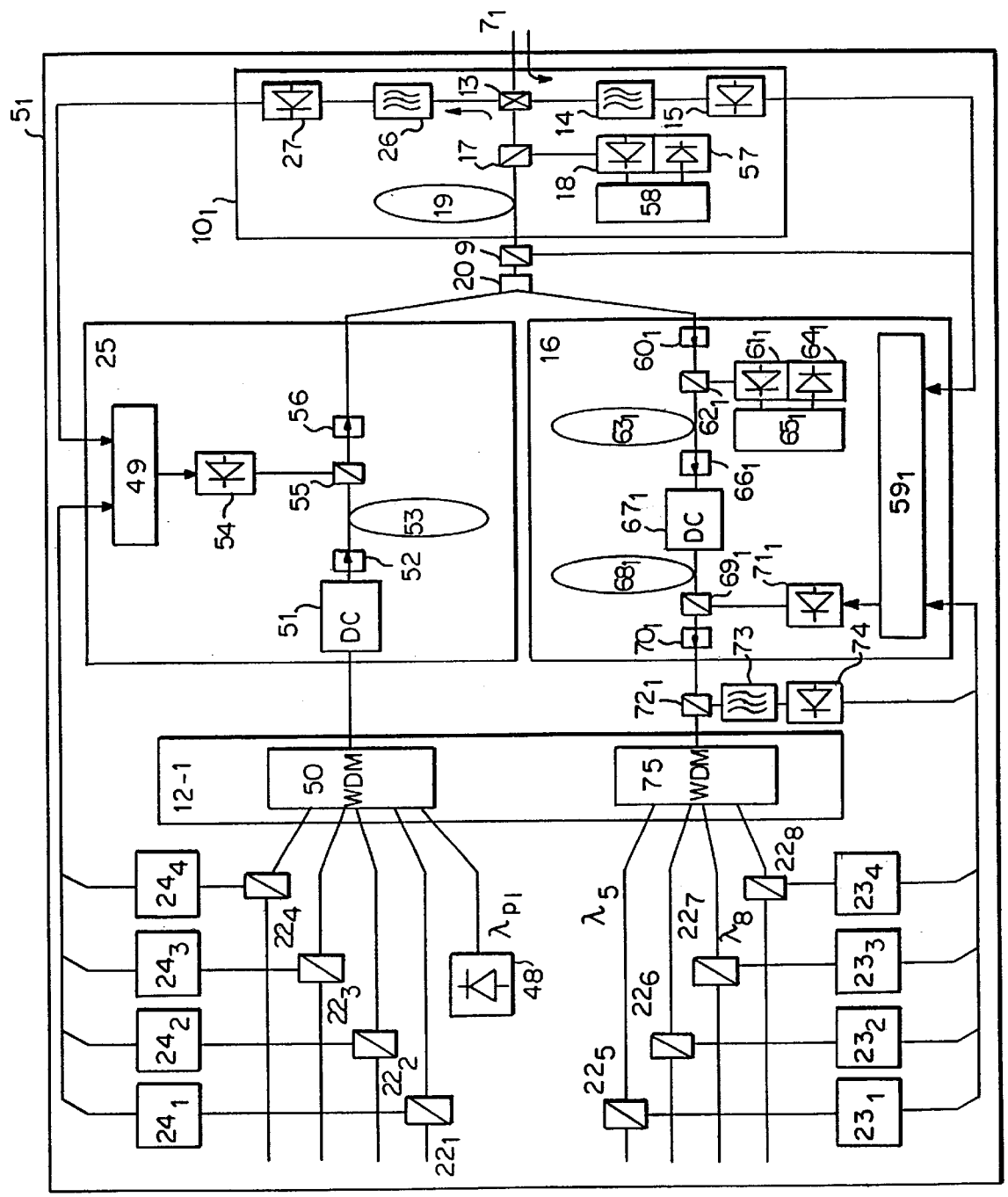
FIG. 4 is a block diagram for illustrating a configuration and functions of an embodiment of a terminal station repeater according to the present invention.

Described below using FIG. 4 is still another embodiment of optical transmission devices according to a second mode for carrying out the present invention.

Figure 5:
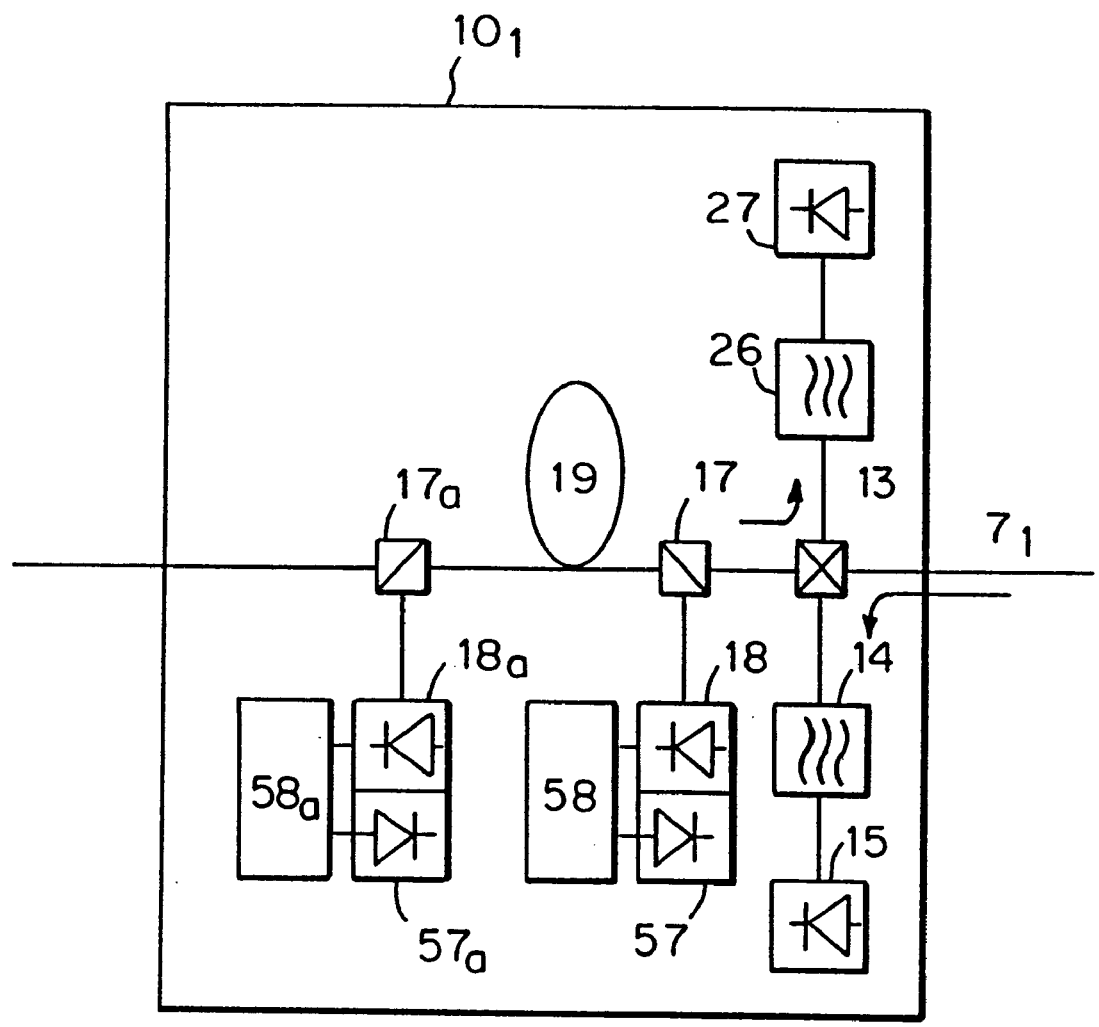
FIG. 5 is a block diagram illustrating an embodiment of a buffer light amplifying unit according to the present invention.
Figure 6:
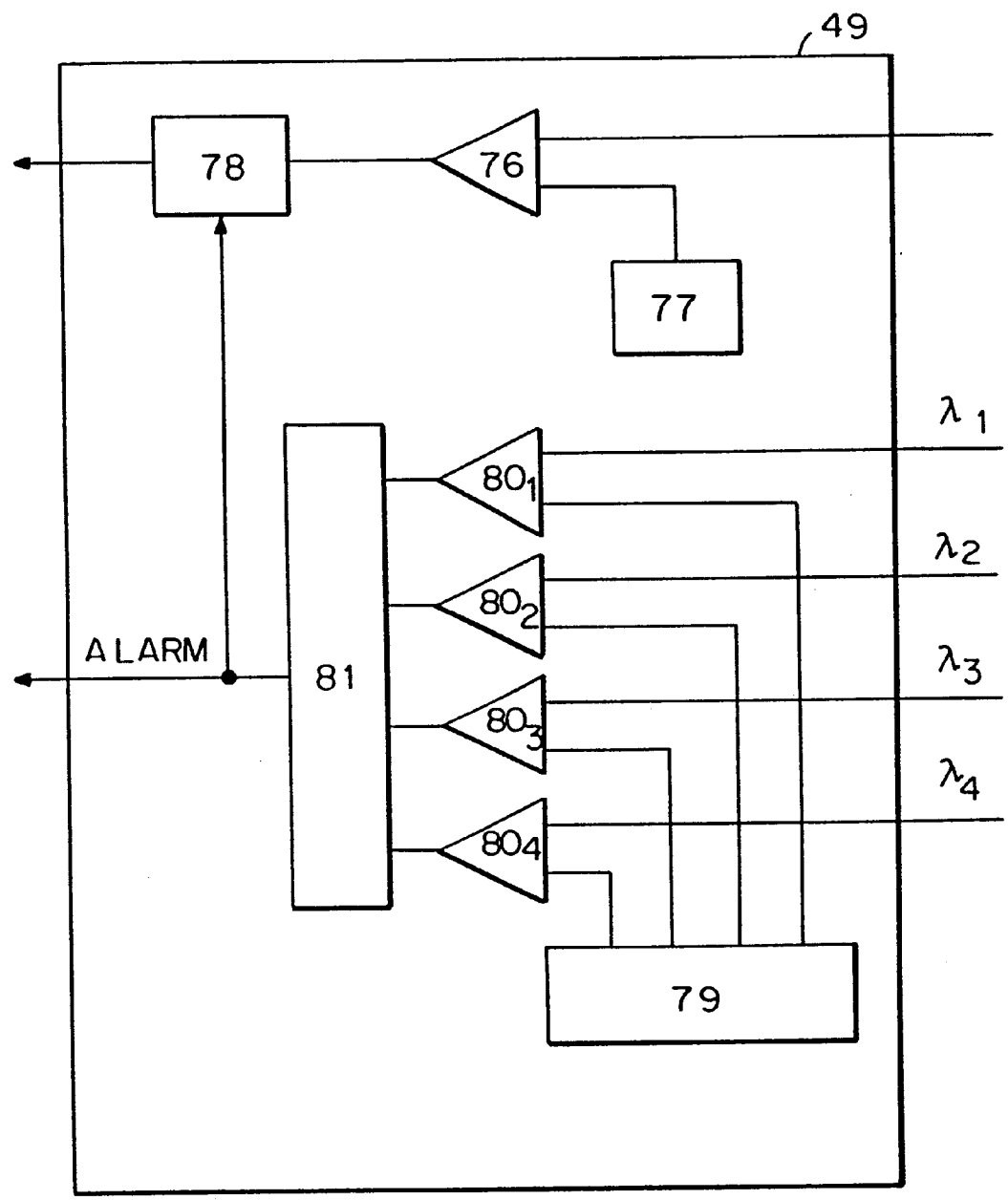
FIG. 6 is a block diagram for illustrating a configuration and functions of an embodiment of a control unit according to the present invention.

Here, FIG. 4 is a block diagram illustrating functions of a terminal station repeater. FIG. 5 is a block diagram illustrating a buffer light amplifying unit, and FIG. 6 is a block diagram illustrating functions of a control unit.

Figures 9, 10:
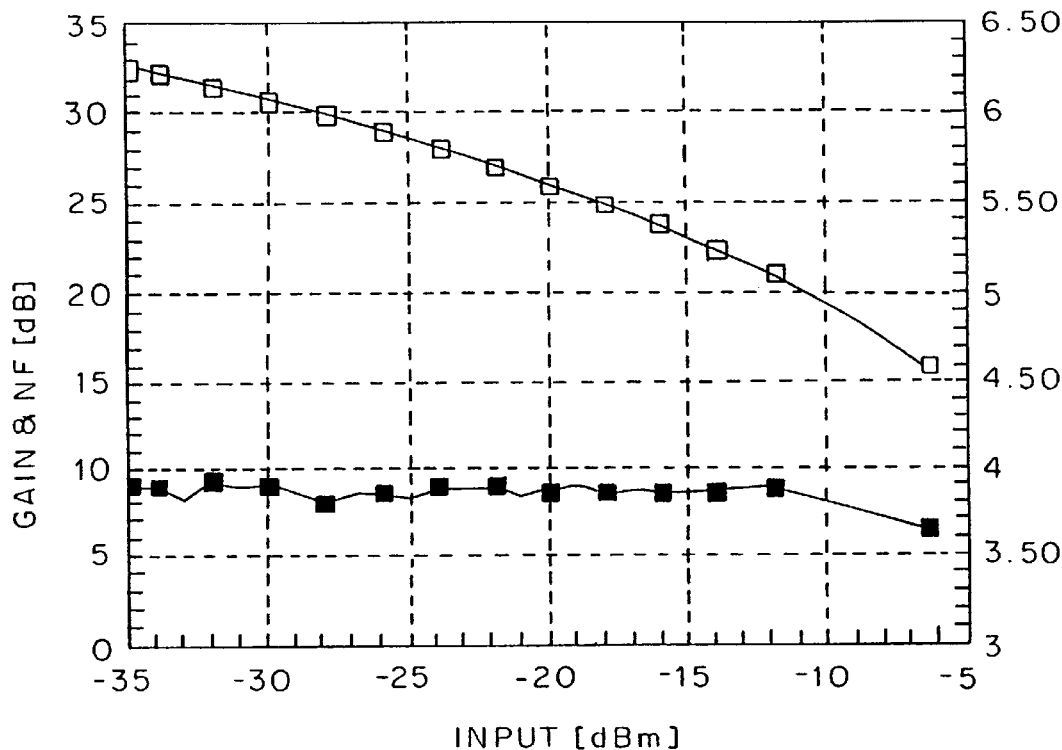
FIG. 9 is a diagram illustrating an experimental result obtained by using an embodiment of a terminal station repeater according to the present invention.
FIG. 10 is a diagram illustrating an experimental result obtained by using an embodiment of a terminal station repeater according to the present invention.

Also, FIG. 8, and FIG. 9 or FIG. 10 are diagrams indicating experimental results obtained by using a terminal station repeater.

In FIG. 4, the signal light includes the four wavelengths: $\lambda 1=1530.33$ nm, $\lambda 2=1531.90$ nm, $\lambda 3=1533.47$ nm, and $\lambda 4=1535.0$ 4 nm. Moreover, a probe light is transmitted by a probe light source 48 with a wavelength of $\lambda p1=1543.73$. Meanwhile, the four wavelengths are received; $\lambda 5=1555.75$ nm, $\lambda 6=1557.36$ nm, $\lambda 7=1558.98$ nm, and $\lambda 8=1560.61$ nm. Furthermore, a probe light is received by a probe light receiver (not illustrated) with a wavelength of $\lambda p2=1546.92$.

Each of the wavelengths of $\lambda 1$ to $\lambda 4$ is branched by optical couplers 22-1 to 22-4 each of the branching ratios of which is 5:95, and is respectively detected by optical detectors $24_1$ to $24_4$. An input supervisory unit signal for each of the detected wavelengths is transferred into a control unit 49 described hereinafter inside an optical amplifier 25. The signal lights and the probe light, which have passed through optical couplers $22_1$ to $22_4$, are multiplexed by an optical multiplexer 50 inside an optical multiplexer/demultiplexer $12_1$, and passes through a dispersion compensator 51 inside an optical amplifier 25. The dispersion compensator 51 compensates dispersion characteristics which a signal light causes when passing through transmission paths $7_1$ to $7_4$. The multiplexed lights having passed through the dispersion compensator 51 pass through an optical isolator 52, then being introduced into a rare earth-doped optical fiber 53.

The rare earth-doped optical fiber 53 is in an excited state, since a pumping light has been introduced therein through an optical multiplexer 55 by a pumping light source 54, which is a semiconductor laser having the oscillation wavelength in proximity to 1480 nm. Accordingly, the multiplexed lights are amplified, and passing through an optical isolator 56, an optical multiplexer 20, and the supervisory light signal multiplexer/demultiplexer $9_1$, they are introduced into a buffer light amplifying unit $10_1$. The supervisory light signal multiplexer/demultiplexer $9_1$ multiplexes the supervisory light signal at 1.48 μm wavelength and the signal lights.

The multiplexed lights introduced into the buffer light amplifying unit $10_1$ is introduced into an erbium-doped optical fiber as a rare earth-doped optical fiber 19, into which a pumping light has been introduced through an optical multiplexer 17 from a semiconductor laser (a pumping light source 18) having the oscillation wavelength in proximity to 980 nm. Although the erbium-doped optical fiber 19 is being in an exited state, the lights which can be amplified are the multiplexed lights at $\lambda 1$ to $\lambda 4$ wavelengths and the probe light only. The supervisory light signal at 1.48 μm passes through the fiber after suffering from some loss. Also, the pumping light source 18 is monitored by an optical detector 57 for detecting a portion of the optical output from the pumping light source 18. At that time, a control unit 58 is configured to control the devices so that the pumping light source supervisory unit signal remains unchanged.

The amplified multiplexed lights and the supervisory light signal at 1.48 μm are partially branched by an optical coupler 13 the branching ratio of which is 5:95. A portion of the probe light, which has passed through a narrow bandwidth optical filter 26 allowing the probe light to pass through, is detected by an optical detector 27. The detected probe light supervisory unit signal is conveyed to the above-mentioned control unit 49. The control unit 49 is configured to control the pumping light source 54 so that the probe light supervisory unit signal remains unchanged. In this way, by controlling the devices so that the probe light supervisory unit signal remains unchanged, it becomes possible to control and maintain all the signal lights at $\lambda 1$ to $\lambda 4$ wavelengths at fixed outputs.

Namely, if any of the signal lights at $\lambda 1$ to $\lambda 4$ wavelengths shut down, or even if a signal light other than the signal lights at $\lambda 1$ to $\lambda 4$ wavelengths is newly added, no influences are exerted on optical outputs of the signal lights at $\lambda 1$ to $\lambda 4$ wavelengths (for example, when a signal light at $\lambda 4$ is cut off, signal lights at $\lambda 1$ to $\lambda 3$). This always makes it possible to perform a fixed and stable control of the device.

The amplified multiplexed lights and the supervisory light signal having passed through the optical coupler 13 are transferred to the transmission path $7_1$, which is a single mode transmission fiber.

Here, the dispersion compensator 51 may be omitted when dispersion characteristics of the transmission paths exerts no influence on transmission characteristics of the whole system. Also, a place at which the dispersion compensator 51 is to be set does not necessarily coincide with this position. A part consisting of the rare earth-doped optical fiber 53, the pumping light source 54, and the optical multiplexer 55 may be replaced by a semiconductor optical amplifier. In this case, it is advisable that an amplification ratio is controlled by a pumping electric current instead of the pumping light source 54. As is much the same way, a part consisting of the rare earth-doped optical fiber 19, the pumping light source 18, and the optical multiplexer 17 may be replaced by a semiconductor optical amplifier.

On the other hand, reverse-directional signal lights at $\lambda 5$ to $\lambda 8$ and a reverse-directional multiplexed light at $\lambda p2$, which are transmitted from the transmission fiber $7_1$, and the supervisory light signal at 1.48 μm are partially branched by the optical coupler 13 the branching ratio of which is 5:95. A portion of the probe light, which has passed through a narrow bandwidth optical filter 14 allowing the probe light to pass through, is detected by an optical detector 15. The detected input supervisory unit signal is conveyed to a control unit 59 described hereinafter. The multiplexed lights and the supervisory light signal having passed through the optical coupler 13 are multiplexed with a pumping light from the semiconductor laser as the pumping light source 18 having the oscillation wavelength in proximity to 980 nm by the optical multiplexer 17 inside the buffer light amplifying unit $10_1$, thus being amplified by the erbium-doped optical fiber 19. In this case, too, the lights which can be amplified are the multiplexed lights at $\lambda 5$ to $\lambda 8$ and at $\lambda p2$ only. The supervisory light signal at 1.48 μm passes through the fiber after suffering from some loss. The supervisory light signal at 1.48 μm having passed through the fiber is demultiplexed by the supervisory light signal multiplexer/demultiplexer $9_1$, then being transmitted into a supervisory light signal path. The multiplexed lights, having passed through the optical multiplexer 20 and an optical isolator 60 inside the optical amplifier 16, are multiplexed by an optical multiplexer 62 with a pumping light from a semiconductor laser as a pumping light source 61 having the oscillation wavelength in proximity to 980 nm, thus being amplified by an erbium-doped optical fiber 63. Also, the pumping light source 61 is monitored by an optical detector 64 for detecting a portion of the optical output from the pumping light source 61. At that time, a control unit 65 is configured to control the devices so that the pumping light source supervisory unit signal remains unchanged.

The amplified signal lights, passing through an optical isolator 66, are introduced Into a dispersion compensator 67. After being amplified by a second erbium-doped optical fiber 68, the signal lights pass through an optical multiplexer 69, then being outputted from an optical isolator 70. The second erbium-doped optical fiber 68 is in an exited state, since it is multiplexed with a pumping light from a semiconductor laser (a second pumping light source 71) having the oscillation wavelength in proximity to 980 nm. The multiplexed lights from the optical isolator 70 are partially branched by an optical coupler 72 the branching ratio of which is 5:95. Branched multiplexed lights pass through a narrow bandwidth optical filter 73 allowing the probe light to pass through, and a portion of the probe light is detected by an optical detector 74. The detected output supervisory unit signal is conveyed to the control unit 59 inside the optical amplifier 16. At that time, a pumping light source 71 is configured to be controlled so that the output supervisory unit signal remains unchanged.

Multiplexed lights having passed through the optical coupler 72 are demultiplexed for each of the wavelengths of $\lambda 5$ to $\lambda 8$ by an optical demultiplexer 75. The each wavelength is branched by optical couplers $22_5$ to $22_8$ each of the branching ratios of which is 5:95, and is respectively detected by optical detectors $23_1$ to $23_4$. An output supervisory unit signal for each of the detected wavelengths is transferred into the control unit 59 inside the optical amplifier 16. A signal light at each of the wavelengths having passed through the optical couplers $22_5$ to $22_8$ is conveyed to a terminal station unit (not illustrated).

In the present configuration, a signal input power into the buffer light amplifying unit $10_1$ from the transmission path $7_1$ falls in a range of −30 dBm to −5dBm, and a signal amplification gain in the buffer light amplifying unit $10_1$ is equal to an order of about 10 dB. Since there is furnished no optical isolator within the buffer light amplifying unit $10_1$, attention must be paid to oscillation phenomena of light. Accordingly, the signal amplification gain in the buffer light amplifying unit $10_1$ should be, preferably, 30 dB or less, or more preferably, 15 dB or less. Also, by making a positive gain the signal amplification gain in the buffer light amplifying unit $10_1$, a noise figure for a signal input from the transmission path $7_1$ in the terminal station repeater is obviously improved as compared with the methods in the prior art, but more preferably, it should be 5 dB or more.

Moreover, it is preferable that amplification gain distributions in the core light amplifying unit $11_1$ and the buffer light amplifying unit $10_1$ should be calculated from a necessary output power into the transmission path $7_1$. For example, assuming that the output power into the transmission path is equal to +11 dBm per signal wavelength, the total signal power ($\lambda 1$ to $\lambda 4$ and $\lambda p2$) turns out to be +18 dBm, and consequently it is preferable that a power of the pumping light source 18 should be set to be about 1.25 to 3.3 times as high as this power. When the power of the pumping light source is not enough, as illustrated in FIG. 5, the following units may be added, thereby providing a bi-directional pumping for the erbium-doped optical fiber: a new pumping light source 18-a, an optical detector 57-a for detecting the optical output thereof, a control unit 58-a for keeping a detected supervisory unit signal unchanged, and an optical multiplexer 17-a for introducing the pumping light. Besides, in any case, it is preferable that the pumping light source 18, which corresponds to a forward pumping for the multiplexed lights from the transmission path $7_1$, is furnished.

Based on the ability of the pumping light source 18 set above, it is possible to set an input power of the multiplexed lights, which are conveyed into the buffer light amplifying unit $10_1$ from the optical amplifier 25, at the value of [the optical output from the buffer light amplifying unit 10-1 (+11 dBm)–X dB]. It is preferable that a range of X should be 0 to 20. An adjustment of X makes it possible to set, at the above-mentioned more preferable value, a signal amplification gain for a signal input power which is reverse-directional, i.e. in a direction from the transmission path $7_1$.

Here, a 980 nm semiconductor laser may be employed as the pumping light source 54 inside the optical amplifier 25. Also, a 1480 nm semiconductor laser may be employed as the pumping light source 71 inside the optical amplifier 16.

However, an employment of the 980 nm semiconductor laser is best suited for the pumping light source 18 inside the buffer light amplifying unit $10_1$ and the pumping light source $61_1$ inside the optical amplifier 16.

Described below with reference to FIG. 6 is a configuration of an embodiment of the control unit 49.

An output supervisory unit signal transmitted into the control unit 49 has been compared with a predetermined reference value 77 by a comparing unit 76. A pumping light source 54 (not illustrated) is controlled by transmitting an error signal relative to the reference value 77 to a driving circuit 78.

Also, input supervisory unit signals corresponding to $\lambda 1$ to $\lambda 4$ transmitted into the control unit 49 have been respectively compared with a reference value 79 by a comparing unit 80. When they are higher than the predetermined value, a normal signal is transmitted to a wavelength number detection circuit 81, and when they are lower, an abnormal signal is transmitted. The wavelength number detection circuit 81 counts the wavelength number of the transmitted normal signal, thus judging the wavelength number which can be transferred at the moment. When there turns out to be no wavelength which can be transferred, the wavelength number detection circuit issues an alarm. Also, at that time, the alarm is transmitted to the driving circuit 78, too. Having received the alarm, the driving circuit 78 is configured to control and halt the pumping light source 54 (not illustrated).

Figure 7:
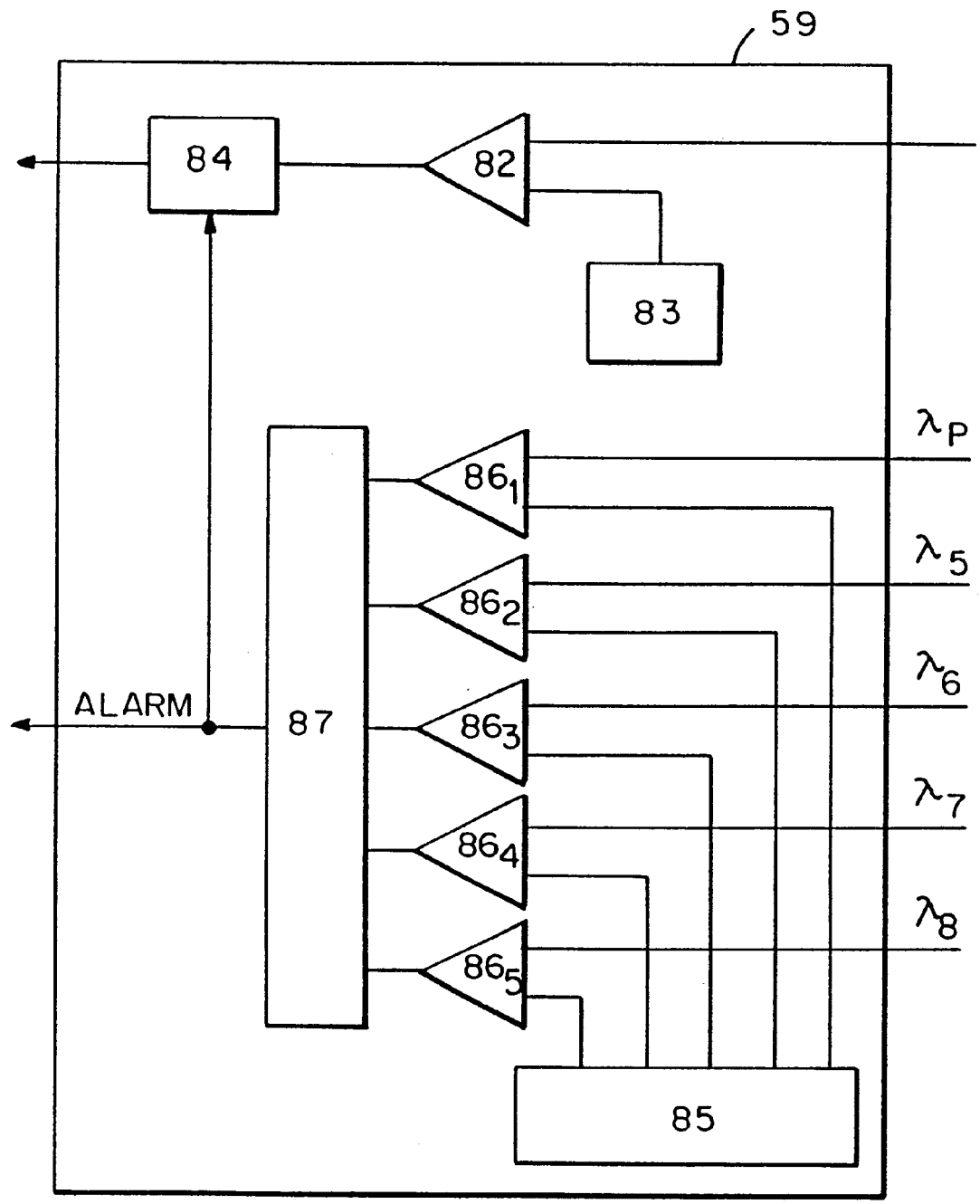
FIG. 7 is a block diagram for illustrating a configuration and functions of an embodiment of a control unit according to the present invention.

Another configuration of an embodiment of the control unit 59 will be described hereunder and illustrated in FIG. 7.

An output supervisory unit signal transmitted into the control unit 59 has been compared with a predetermined reference value 83 by a comparing unit 82. The pumping light source 71 (not illustrated) is controlled by transmitting an error signal relative to the reference value 83 to a driving circuit 84.

Output supervisory unit signals corresponding to $\lambda 5$ to $\lambda 8$ and an input supervisory unit signal corresponding to $\lambda p2$ transmitted into the control unit 59 have been respectively compared with a reference value 85 by a comparing unit 86. When they are higher than the predetermined value, a normal signal is transmitted to a wavelength number detection circuit 87, and when they are lower, an abnormal signal is transmitted. The wavelength number detection circuit 87 counts the wavelength number of the transmitted normal signal, thus judging the wavelength number which can be transferred at the moment. When there turns out to be no wavelength which can be transferred, the wavelength number detection circuit issues an alarm. Also, at that time, the alarm is transmitted to the driving circuit 84, too. Having received the alarm, the driving circuit 84 is configured to control and halt the pumping light source 71 (not illustrated). The control may be executed so that the alarm is issued even when the signal which can be transferred is the one corresponding to $\lambda p2$ only.

A characteristic in the buffer light amplifying unit $10_1$ according to the present invention is to introduce multiplexed lights into the rare earth-doped optical fiber 19 from bi-directions and then amplify the multiplexed lights bi-directionally. Also, another characteristic is to amplify attenuated multiplexed lights introduced from the transmission path $7_1$ before they suffer from considerable losses.

As described above, the control unit 58 controls and maintains an output of the pumping light source 18 at a fixed value. This makes it possible to allow the buffer light amplifying unit $10_1$ to function as a light amplifying unit having an approximately constant gain as well as to maintain a stable and lowered noise figure of the buffer light amplifying unit. Controlling an output of the pumping light source 18 at a fixed value is important for reducing a wavelength dependence of the gain, which rare earth-doped optical fibers generally have, and for suppressing a wavelength deviation variation of the gain, which turns out to be a problem in the transmission characteristics.

Furthermore, as described above, the control unit 49 controls and maintains an output of the probe light at a fixed value. This makes it possible to automatically control outputs of multiplexed lights into the transmission path $7_1$ inside the buffer light amplifying unit $10_1$.

FIGS. 8, 9 and 10 illustrate the results of an experiment in which the input/output characteristics and a noise figure of the signal light are measured in the present embodiment when operated. More particularly, FIGS. 8 and 9 illustrate the results of the experiment on the whole system including a buffer light amplifier and a core light amplifier. FIG. 10 illustrates the results of the experiment on only the buffer light amplifier.

The measurement points of the experiment are explained by using FIG. 4. The input power of FIG. 8 is the signal level from transmission line $17_1$. The output power of FIG. 8 is the signal level after an amplification of the first stage of optical amplifier 16. ASE LEVEL is the value that divided the power of amplified spontaneous emission light (ASE) of the 1550nm by the wavelength. The ASE level is used for the calculation of the noise figure. This experiment is implemented using the following conditions: (a) the reverse signal of about +11 dBm, that is amplified by the optical amplifier 25, is introduced to the buffer light amplifier $10_1$; and (b) signal output of +17 dBm is always delivered to the transmission line $17_1$. Under the above conditions, the output power of the pumping light source for the buffer light amplifier is supplied at about 110 mW, that is the equivalent of 2.2 times of +17 dBm, which is signal output power.

According to FIG. 9, which illustrates a graph of the gain and noise figure against the input power, it is clear that noise figure against the input signal from the transmission path is controlled to 3.9 dB or less. Even if the temperature fluctuation is a non-experimental system and dispersion at the time of manufacturing are considered, according to the present invention, it can be controlled to 4.5 dB or less. In addition, it can be made less than 4.0 dB by maintaining experimental structure in the actual system.

The excitation power of semiconductor laser 61, of the pumping light source of the first stage of optical amplifier 16 was made 75 mW in this experiment. Therefore, output power cannot be constantly controlled. However, it is possible to constantly control output power by making the excitation power of a semiconductor laser $6_1$ 100–120 mW.

FIG. 10 illustrates that the input signal gain of the buffer light amplifier $10_1$ maintains 10 dB constantly under the condition of signal output of reverse direction that is maintained at +17 dBm.

Figure 11:
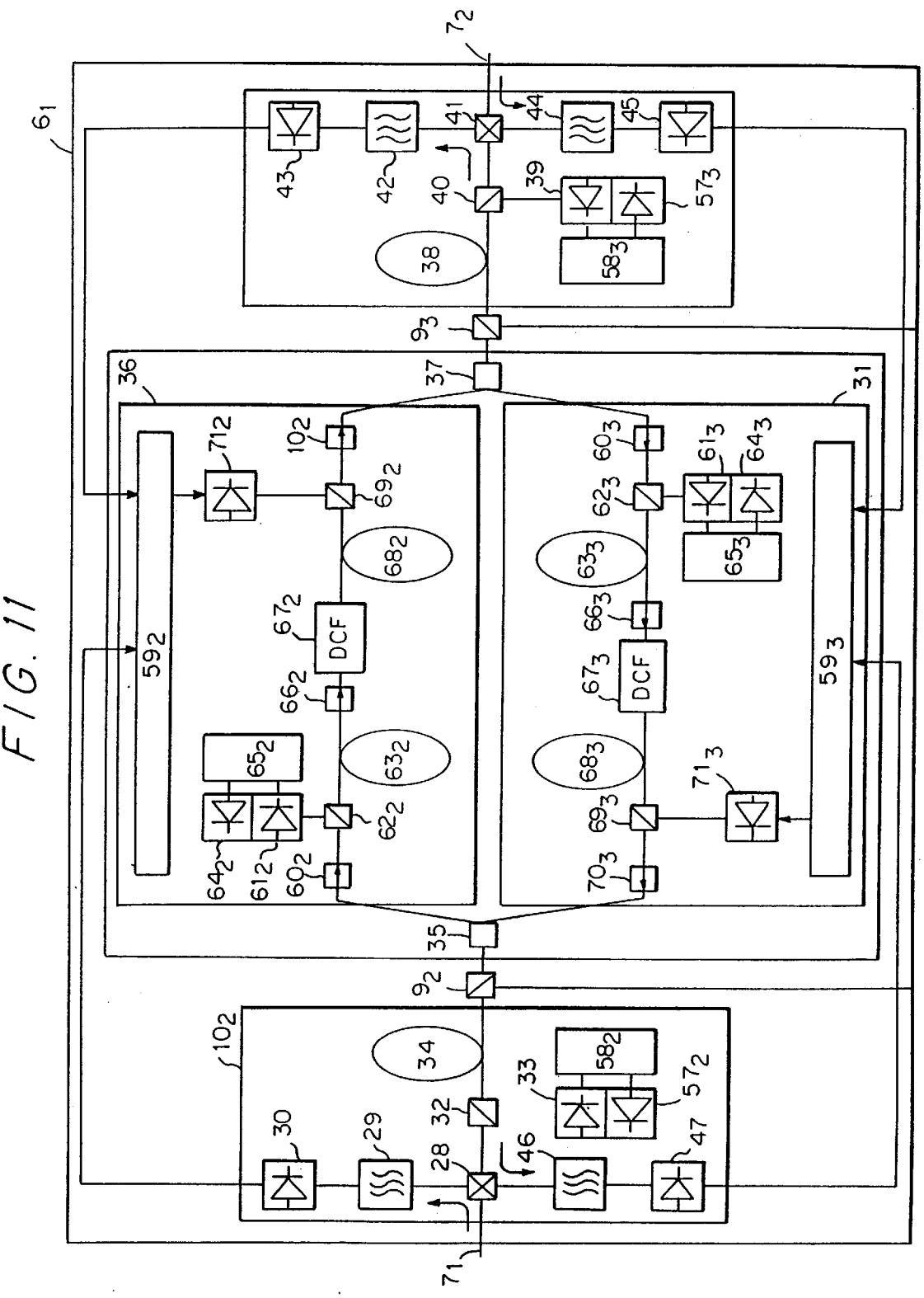
FIG. 11 is a block diagram for illustrating a configuration and functions of an embodiment of an intermediate repeater according to the present invention.

Described below using FIG. 11 is an even further embodiment of optical transmission devices according to a second mode for carrying out the present invention. FIG. 11 is a block diagram which illustrates a configuration and functions of an intermediate repeater.

Signal lights at the four wavelengths are transmitted, from a transmission path 7-1: $\lambda 1$=1530.33 nm, $\lambda 2$=1531.90 nm, $\lambda 3$=1533.47 nm, and $\lambda 4$=1535.04 nm. Moreover, a probe light at $\lambda p1$=1543.73 is transmitted. Meanwhile, the four wavelengths are transmitted from a transmission path $7_2$: $\lambda 5$=1555.75 nm, $\lambda 6$=1557.36 nm, $\lambda 7$=1558.98 nm, and $\lambda 8$=1560.61 nm. Furthermore, a probe light at $\lambda p2$=1546.92 is transmitted.

The present embodiment differs from the terminal station repeater illustrated in that Buffer light amplifying units $10_2$, $10_3$ are set at the both ends of a core light amplifying unit $11_2$, and the core light amplifying unit $11_2$ is configured by two units of optical amplifiers 31, 36, each of which has the same configuration as that of the optical amplifier 16 in FIG. 4.

The signal lights at $\lambda 1$ to $\lambda 4$ and a multiplexed light at $\lambda p1$, which are transmitted from the transmission fiber $7_1$, and a supervisory light signal at 1.48 μm are partially branched by an optical coupler 28 the branching ratio of which is 5:95. A portion of the probe light, which has passed through a narrow bandwidth optical filter 29 allowing a probe light to pass through, is detected by an optical detector 30. The detected input supervisory unit signal is conveyed to a control unit $59_2$ described hereinafter. The multiplexed lights and the supervisory light signal having passed through the optical coupler 28 are multiplexed with a pumping light from a semiconductor laser as a pumping light source 33 having the oscillation wavelength in proximity to 980 nm by an optical multiplexer 32 inside the buffer light amplifying unit $10_2$, thus being amplified by an erbium-doped optical fiber as a rare earth-doped optical fiber 34. At that time, the erbium-doped optical fiber 34 is in an exited state, but the lights which can be amplified are the multiplexed lights at $\lambda 1$ to $\lambda 4$ and the probe light only. The supervisory light signal at 1.48 μm passes through the fiber after suffering from some loss.

Also, the pumping light source 33 is monitored by an optical detector $57_2$ for detecting a portion of the optical output from the pumping light source 33. At that time, a control unit $58_2$ is configured to control the devices so that the pumping light source supervisory unit signal remains unchanged.

The supervisory light signal at 1.48 μm having passed through the fiber is demultiplexed by a supervisory light signal multiplexer/demultiplexer $9_2$, then being transmitted into a supervisory light signal path. The multiplexed lights, having passed through an optical multiplexer 35 and an optical isolator $60_2$ inside the optical amplifier 36, are multiplexed by an optical multiplexer $62_2$ with a pumping light from a semiconductor laser as a pumping light source 61-2 having the oscillation wavelength in proximity to 980 nm, thus being amplified by an erbium-doped optical fiber $63_2$. Also, the pumping light source $61_2$ is monitored by an optical detector $64_2$ for detecting a portion of the optical output from the pumping light source $61_2$. At that time, a control unit $65_2$ is configured to control the devices so that the pumping light source supervisory unit signal remains unchanged.

The amplified signal lights, passing through an optical isolator $66_2$, are introduced into a dispersion compensator $67_2$. After being amplified by a second erbium-doped optical fiber $68_2$, the signal lights pass through an optical multiplexer $69_2$, then being outputted from an optical isolator $70_2$. Since it is multiplexed with a pumping light from a semiconductor laser as a second pumping light source $71_2$ having the oscillation wavelength in proximity to 980 nm, the second erbium-doped optical fiber $68_2$ is in an exited state. The multiplexed lights from the optical isolator $70_2$, passing through an optical multiplexer 37 and a supervisory light signal multiplexer/demultiplexer $9_3$, are introduced into the buffer light amplifying unit $10_3$. The supervisory light signal multiplexer/demultiplexer $9_3$ multiplexes the supervisory light signal at 1.48 μm wavelength and the signal lights.

The multiplexed lights introduced into the buffer light amplifying unit $10_3$ is introduced into an erbium-doped optical fiber as a rare earth-doped optical fiber 38, into which a pumping light has been introduced through an optical multiplexer 40 from a semiconductor laser as a pumping light source 39 having the oscillation wavelength in proximity to 980 nm. Although the erbium-doped optical fiber 38 is being in an exited state, the lights which can be amplified are the multiplexed lights at $\lambda 1$ to $\lambda 4$ wavelengths and the probe light only. The supervisory light signal at 1.48 μm passes through the fiber after suffering from some loss.

Also, the pumping light source 39 is monitored by an optical detector $57_3$ for detecting a portion of the optical output from the pumping light source 39. At that time, a control unit $58_3$ is configured to control the devices so that the pumping light source supervisory unit signal remains unchanged. The amplified multiplexed lights and the supervisory light signal at 1.48 μm are partially branched by an optical coupler 41 the branching ratio of which is 5:95. A portion of the probe light, which has passed through a narrow bandwidth optical filter 42 allowing a probe light to pass through, is detected by an optical detector 43. The detected probe light supervisory unit signal is conveyed to the above-mentioned control unit $59_2$. The control unit $59_2$ is configured to control the pumping light source $71_2$ so that the probe light supervisory unit signal remains unchanged. In this way, by controlling the devices so that the probe light supervisory unit signal remains unchanged, it becomes possible to control and maintain all the signal lights at $\lambda 1$ to $\lambda 4$ wavelengths at fixed outputs.

If any of the signal lights at $\lambda 1$ to $\lambda 4$ wavelengths is cut off, or even if a signal light other than the signal lights at $\lambda 1$ to $\lambda 4$ wavelengths is newly added, no influences are exerted on optical outputs of the signal lights at $\lambda 1$ to $\lambda 4$ wavelengths (for example, when a signal light at $\lambda 4$ is cut off, signal lights at $\lambda 1$ to $\lambda 3$). This always makes it possible to perform a fixed and stable control of the device.

The amplified multiplexed lights and the supervisory light signal having passed through the optical coupler 41 are transferred to the transmission path 7-2, which is a single mode transmission fiber.

A part including the rare earth-doped optical fibers 34, $63_2$, $68_2$, 38, the pumping light sources 33, $61_2$, $71_2$, 39, and the optical multiplexers 32, $62_2$, 40 may be replaced by a semiconductor optical amplifier. In this case, it is advisable that an amplification ratio is controlled by a pumping electric current instead of the pumping light sources 33, $61_2$, $71_2$, 39.

On the other hand, reverse-directional signal lights at $\lambda 5$ to $\lambda 8$ and a reverse-directional multiplexed light at $\lambda 2$, which are transmitted from the transmission fiber $7_2$, and a supervisory light signal at 1.48 $\mu$m are partially branched by the optical coupler 41 the branching ratio of which is 5:95. The wavelength of the supervisory light signal can also be 1.51 $\mu$m. A portion of the probe light, which has passed through a narrow bandwidth optical filter 44 allowing a probe light to pass through, is detected by an optical detector 45. The detected input supervisory unit signal is conveyed to a control unit $59_3$ described hereinafter.

The multiplexed lights and the supervisory light signal having passed through the optical coupler 41 are multiplexed with a pumping light from the semiconductor laser as the pumping light source 39 having the oscillation wavelength in proximity to 980 nm by the optical multiplexer 40 inside the buffer light amplifying unit $10_3$, thus being amplified by the erbium-doped optical fiber as the rare earth-doped optical fiber 38. At that time, the erbium-doped optical fiber 38 is in an exited state, but the lights which can be amplified are the multiplexed lights at $\lambda 5$ to $\lambda 8$ and the probe light only. The supervisory light signal at 1.48 $\mu$m passes through the fiber after suffering from some loss.

Also, the pumping light source 39 is monitored by the optical detector $57_3$ for detecting a portion of the optical output from the pumping light source 39. At that time, a control unit $58_3$ is configured to control the devices so that the pumping light source supervisory unit signal remains unchanged. The supervisory light signal at 1.48 $\mu$m having passed through the fiber is demultiplexed by the supervisory light signal multiplexer/demultiplexer $9_3$, then being transmitted into a supervisory light signal path. The multiplexed lights, having passed through the optical multiplexer 37 and an optical isolator $60_3$ inside the optical amplifier 31, are multiplexed by an optical multiplexer $62_3$ with a pumping light from a semiconductor laser as a pumping light source $61_3$ having the oscillation wavelength in proximity to 980 nm, thus being amplified by an erbium-doped optical fiber $63_3$. Also, the pumping light source $61_3$ is monitored by an optical detector $64_3$ for detecting a portion of the optical output from the pumping light source $61_3$. At that time, a control unit $65_3$ is configured to control the devices so that the pumping light source supervisory unit signal remains unchanged.

The amplified signal lights, passing through an optical isolator $66_3$, are introduced into a dispersion compensator $67_3$. After being amplified by a second erbium-doped optical fiber $68_3$, the signal lights pass through an optical multiplexer $69_3$, then being outputted from an optical isolator $70_3$. The second erbium-doped optical fiber $68_3$ is in an exited state, since it is multiplexed with a pumping light from a semiconductor laser as a second pumping light source $71_3$ having the oscillation wavelength in proximity to 980 nm. The multiplexed lights from the optical isolator $70_3$, passing through an optical multiplexer 35 and the supervisory light signal multiplexer/demultiplexer $9_2$, are introduced into the buffer light amplifying unit $10_2$. The supervisory light signal multiplexer/demultiplexer $9_2$ multiplexes the supervisory light signal at 1.48 $\mu$m wavelength and the signal lights.

The multiplexed lights introduced into the buffer light amplifying unit $10_2$ is introduced into the erbium-doped optical fiber as the rare earth-doped optical fiber 34, which is raised to be in an exited state by a pumping light from the semiconductor laser as the pumping light source 33 having the oscillation wavelength in proximity to 980 nm. The lights which can be amplified are the multiplexed lights at $\lambda 5$ to $\lambda 8$ wavelengths and the probe light only. The supervisory light signal at 1.48 $\mu$m passes through the fiber after suffering from some loss.

Also, the pumping light source 33 is monitored by the optical detector $57_2$ for detecting a portion of the optical output from the pumping light source 33. At that time, the control unit $58_2$ is configured to control the devices so that the pumping light source supervisory unit signal remains unchanged. The amplified multiplexed lights and the supervisory light signal at 1.48 $\mu$m are partially branched by the optical coupler 28 the branching ratio of which is 5:95. A portion of the probe light, which has passed through a narrow bandwidth optical filter 46 allowing a probe light to pass through, is detected by an optical detector 47.

The detected probe light supervisory unit signal is conveyed to the above-mentioned control unit $59_3$. The control unit $59_3$ is configured to control the pumping light source $71_3$ so that the probe light supervisory unit signal remains unchanged. In this way, by controlling the devices so that the probe light supervisory unit signal remains unchanged, it becomes possible to control and maintain all the signal lights at $\lambda 5$ to $\lambda 8$ wavelengths at fixed outputs. If any of the signal lights at $\lambda 5$ to $\lambda 8$ wavelengths is cut off, or even if a signal light other than the signal lights at $\lambda 5$ to $\lambda 8$ wavelengths is newly added, no influences are exerted on optical outputs of the signal lights at $\lambda 5$ to $\lambda 8$ wavelengths (for example, when a signal light at $\lambda 8$ is cut off, signal lights at $\lambda 5$ to $\lambda 7$). This always makes it possible to perform a fixed and stable control of the device.

The amplified multiplexed lights and the supervisory light signal having passed through the optical coupler 28 are transferred to the transmission path $7_1$, which is a single mode transmission fiber.

A part including the rare earth-doped optical fibers 34, $63_3$, $68_3$, 38, the pumping light sources 33, $61_3$, $71_3$, 39, and the optical multiplexers 32, $62_3$, 40 may be replaced by a semiconductor optical amplifier. In this case, it is advisable that an amplification ratio is controlled by a pumping electric current instead of the pumping light sources 33, $61_3$, $71_3$, 39.

In the present configuration, a signal input power into the buffer light amplifying unit $10_2$ or $10_3$ from the transmission path $7_1$ or $7_2$ falls in a range of 5 dBm to 30 dBm, and a signal amplification gain in the buffer light amplifying unit $10_2$ or $10_3$ is equal to an order of about 10 dB. Since there is furnished no optical isolator within the buffer light amplifying unit $10_2$ or $10_3$, an attention must be paid to oscillation phenomena of light. Accordingly, the signal amplification gain in the buffer light amplifying unit $10_2$ or $10_3$ should be, preferably, 30 dB or less, or more preferably, 15 dB or less. Also, by making a positive gain the signal amplification gain in the buffer light amplifying unit $10_2$ or $10_3$, a noise figure for a signal input from the transmission path $7_1$ or $7_2$ in the intermediate repeater is obviously improved as compared with the methods in the prior art, but more preferably, the noise figure should be 5 dB or more.

Moreover, it is preferable that amplification gain distributions in the core light amplifying unit 112 and the buffer light amplifying unit $10_2$ or $10_3$ should be calculated from a necessary output power into the transmission path $7_1$ or $7_2$. For example, assuming that the output power into the transmission path $7_1$ or $7_2$ is equal to +11 dBm per signal wavelength, the total signal power ($\lambda 1$ to $\lambda 4$ and $\lambda p1$, or $\lambda 5$ to $\lambda 8$ and $\lambda p2$) turns out to be +18 dBm, and consequently it is preferable that a power of the pumping light source 33 or 39 should be set to be about 1.25 to 3.3 times as high as this power. When the power of the pumping light source is not enough, as illustrated in FIG. 5, the following units may be added, thereby providing a bi-directional pumping for the erbium-doped optical fibers: a new pumping light source 18-$a$, an optical detector 57-$a$ for detecting the optical output thereof, a control unit 58-$a$ for keeping a detected supervisory unit signal unchanged, and an optical multiplexer 17-$a$ for introducing the pumping light. Besides, in any case, it is preferable that the pumping light sources 33, 39 which correspond to a forward pumping for the multiplexed lights from the transmission paths $7_1$, $7_2$, are furnished.

Based on the ability of the pumping light source 33 or 39 set above, it is possible to set an Input power of the multiplexed lights, which are conveyed into the buffer light amplifying unit $10_2$ or $10_3$ from the optical amplifier 31 or 36, at the value of the optical output from the buffer light amplifying unit $10_2$ or $10_3$ (+11 dBm)–X dB. It is preferable that a range of X should be 0 to 20. An adjustment of X makes it possible to set, at the above-mentioned more preferable value, a signal amplification gain for a signal input power which is reverse-directional, i.e. in a direction from the transmission path $7_1$ in the case of the buffer light amplifying unit $10_2$, and in a direction from the transmission path $7_2$ in the case of the buffer light amplifying unit $10_3$. Here, a 1480 nm semiconductor laser, which is advantageous for a high power pumping, may be employed as the pumping light source $71_2$ inside the optical amplifier 36, or as the pumping light source $71_3$ inside the optical amplifier 31.

However, employment of the 980 nm semiconductor laser is desirable for the pumping light source 33 inside the buffer light amplifying unit $10_2$, the pumping light source 39 inside the buffer light amplifying unit $10_3$, the pumping light source $61_2$ inside the optical amplifier 36, or the pumping light source $61_3$ inside the optical amplifier 31. As per the above description, in much the same way the terminal station repeater $5_1$ is applicable to the terminal station repeater $5_2$, the intermediate repeater $6_1$, is applicable to the intermediate repeaters $6_2$, $6_3$, etc.

Figure 12:
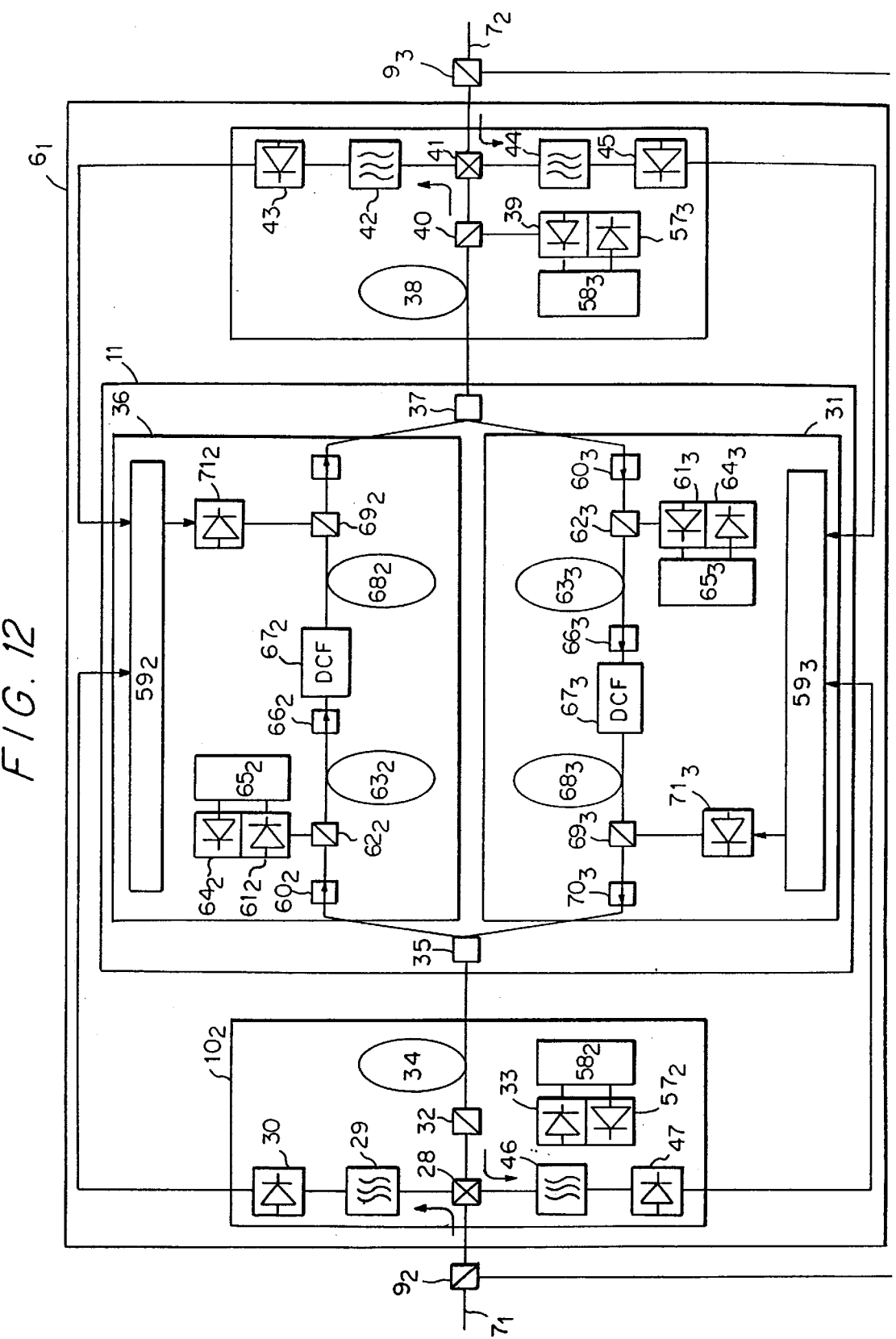
FIG. 12 is a diagram illustrating another embodiment of an intermediate repeater according to the present invention.

With respect to a configuration of the terminal station repeater and an intermediate repeater according to the present invention, the configuration blocks included therein may be located outside the buffer light amplifying unit. For example, FIG. 12 illustrates a configuration in which monitor light multiplexers/demultiplexers $9_2$, $9_3$ are located outside a buffer light amplifying unit. Even in such a configuration, it is possible to obtain the effects given by the buffer light amplifying unit according to the present invention. Regarding an insertion loss of a signal light in the monitor light multiplexers/demultiplexers $9_2$, $9_3$, it should be set to be, more preferably, 1.9 dB or less, or even more preferably, 0.4 dB.

Figure 13:
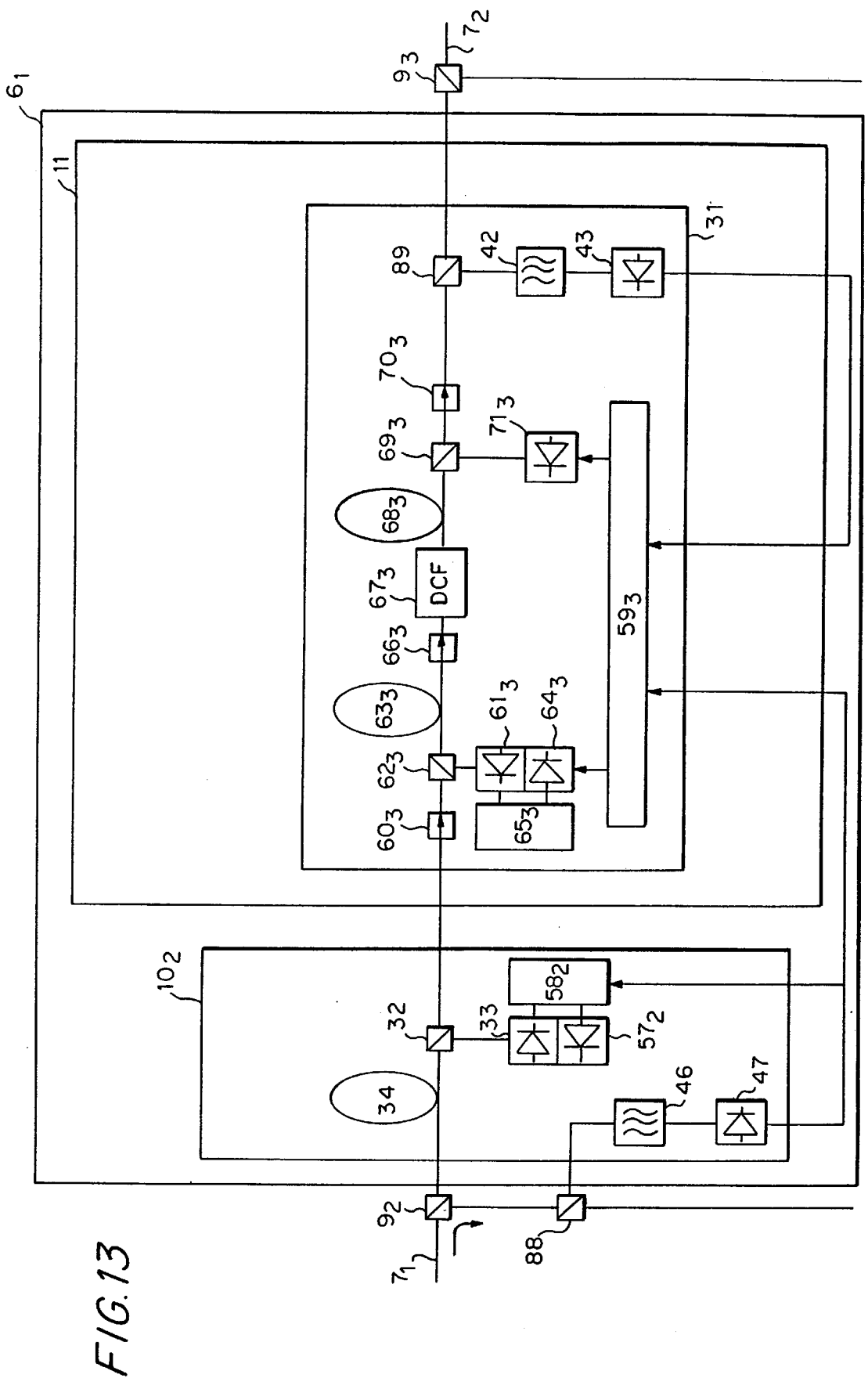
FIG. 13 is a diagram illustrating another embodiment of an intermediate repeater according to the present invention.

Illustrated further in FIG. 13, as a partial derivative embodiment of the bi-directional optical transmission system illustrated in the above-described FIG. 11, is a configuration embodiment of a buffer light amplifying unit and core length amplifying unit in a single-directional optical transmission system. According to the present configuration, a signal light from a transmission path passes through a monitor light multiplexer/demultiplexer $9_2$, then being introduced into the buffer light amplifying unit. A monitor light demultiplexed by the monitor light multiplexer/demultiplexer $9_2$ is multiplexed with an infinitesimal an detectable-enough signal light which, being not completely demultiplexed, is left behind. An optical multiplexer 88 extracts only the signal light from this, and a bandwidth passing light filter 46 and an optical detector 47 detects the signal light input. In the buffer light amplifying unit $10_2$, a demultiplexed signal light, after being amplified by a rare earth-doped optical fiber 34, is introduced into the core light amplifying unit 11 through an optical multiplexer 32. The rare earth-doped optical fiber 34 is the same as the rare earth-doped optical fiber in FIG. 11 in that it is pumped by a pumping light source 33. Also, as is the case with FIG. 11, a portion of a signal light amplified by the core light amplifying unit 11 is partially branched by an optical brancher 89. The signal light amplified by the core light amplifying unit 11 is configured to be introduced again into the transmission path through the monitor light multiplexer/demultiplexer $9_2$.

In the buffer light amplifying unit in the present configuration, there is no need of so much signal gain. This makes it possible to obtain an effect of power of the pumping light source 33 even if the output thereof is comparatively low. Accordingly, for example, the following configuration is allowable. By regarding the pumping light source 33 as a pumping light source $61_3$ or regarding the pumping light source 33 as a pumping light source $71_3$, the pumping light source power is distributed into the two light amplifying units. In that case, it is advisable that a lower pumping light source power should be distributed into the buffer light amplifying unit. The above-described configuration of the present invention is very effective in uni-directional optical transmission systems.

A simple calculation makes it possible to verify the effectiveness of the present configuration. For example, when the signal input is set to be –27 dBm, the value of NF according to the conventional method turns out to be 7 dB or more even if the insertion loss in the monitor light multiplexer/demultiplexer $9_2$ is assumed to be 0.4 dB and the value of NF in the rare earth-doped optical fiber is assumed to be 3.5 dB. On the other hand, the value of NF made possible by the configuration illustrated in FIG. 13 has been found to be 3.86 dB, assuming that the insertion loss in the monitor light multiplexer/demultiplexer $9_2$ is 0.4 dB, a gain in the buffer light amplifying unit $10_2$ is 13 dB, a gain in a previous-step rare earth-doped optical fiber $63_3$ inside the core light amplifying unit 11 is 15.5 dB, a loss in the dispersion compensator 67₃ is 10 dB, and a gain in a next-step rare earth-doped optical fiber 68₃ inside the core light amplifying unit 11 is 18 dB.

Accordingly, the present configuration makes it possible to reduce at least 3 dB of NF, as compared with the conventional configuration. Thus, converting from the signal S/N, it becomes possible to extend a transmission-possible distance by about 100 km or longer. Incidentally, in this trial calculation, a signal light output to a transmission fiber 7₂ in FIG. 13 has turned out to be +6 to 8 dBm, which is extremely close to a value in an actual system.

Figure 14:
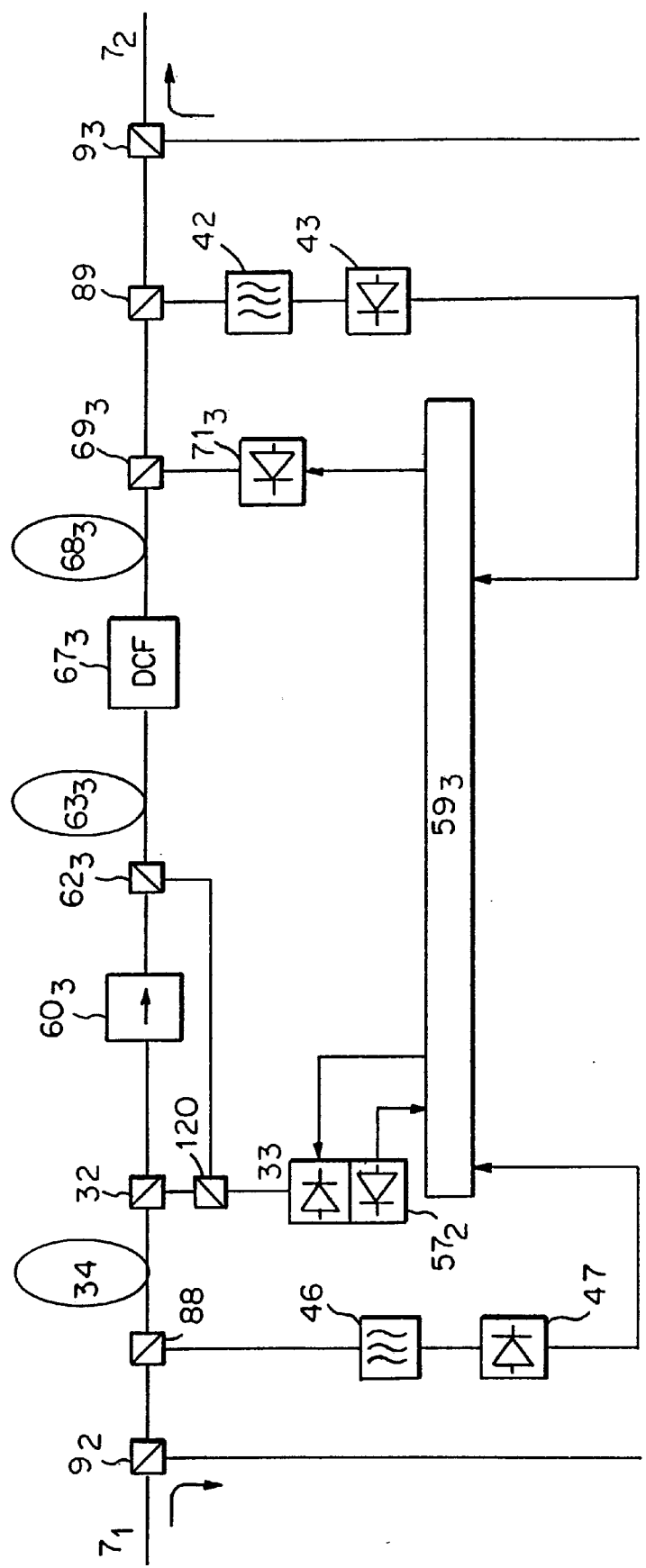
FIGS. 14 and 15 are block diagrams illustrating uni-directional transmission equipment of the present invention.
Figure 15:
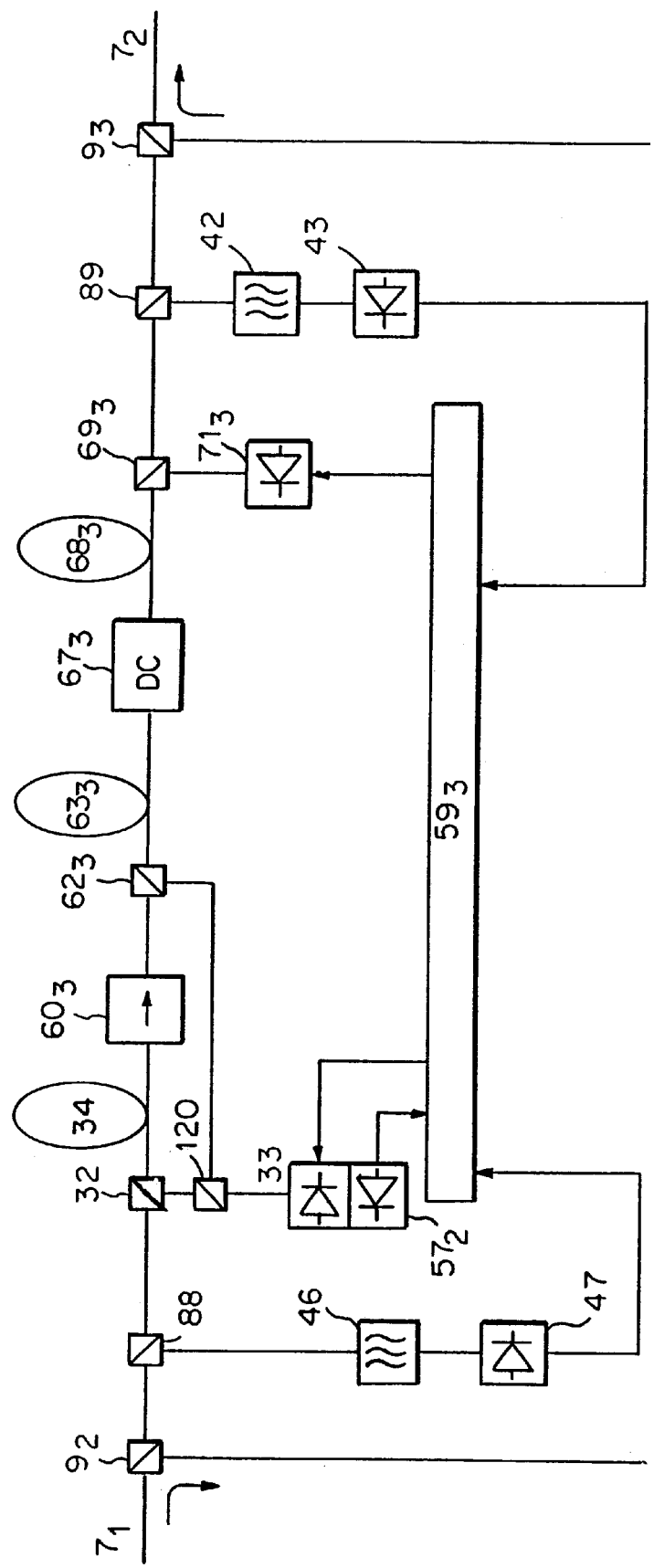

Another embodiment of a one way transmission equipment of the present invention is described using FIGS. 14 and 15. FIGS. 14 and 15 are block diagrams that explain the embodiment of the one way transmission equipment of the present invention. The difference between the two different positions of the pumping light source that excites the doped fiber of the buffer amplifier. That is, in the transmission equipment of FIG. 14, it is backward pumping that is adverse with the transmission direction of the signal light. On the other hand, in the transmission equipment of FIG. 15, it is forward pumping that is the same as the transmission direction of the signal light. Because general and forward excitation is considered as a low noise, only FIG. 15 is explained here. But all the contents are also common to the embodiment of FIG. 14.

The example illustrated in FIG. 15 is the example of transmission equipment that reduced three pumping light sources 33, 61 and 71 used with the one way transmission equipment of FIG. 13 to two pumping light sources and planned economization. The process that the signal light is amplified is quite similar to the embodiment of FIG. 13, and description is omitted. 120 MW pumping light is conducted to coupler 120 of which a branching ration is 2:8 that excite impurity doped fiber 34 from the pumping light source 33 in the structure of this example. The pumping light, from the port of which the branching ratio 2 of coupler 120, excites impurity doped fiber 34 of the buffer amplifier. The pumping light, from the port of which the branching ratio 8 of coupler 120, excites impurity doped fiber 63₃ of the core amplifier. And, in this embodiment, 0.98μm.

The gain of the buffer amplifier is acceptable at 10–16 dB, and the fiber length of impurity doped fiber 34 is also acceptable at 3–6m. When the buffer amplifier is made high excitation, an optical isolator becomes necessary for an input step to the contrary, and it is contrary to the purposes of a present invention. And, the gain of impurity doped fiber 63₃ of the core amplifier is 10–20 dB and fiber length 10–20 m.

Because in this embodiment, a fiber of which dispersion is large is presupposed in 1.5 μm band as transmission fibers 7₁ and 7₂, dispersion compensator 67₃ is used. Therefore, to supply signal loss by dispersion compensator 67₃, the other impurity doped fiber 68₃ is installed in the core amplifier. It is clear that providing transmission equipment for a transmission line using DSF with few dispersion in 1.5 μm band, renders unnecessary the dispersion compensator 67₃, impurity doped fiber 68₃ and pumping light source 71₃.

There is amplification equipment in the preceding phase of isolator 60₂ in this example. As a result NF with the whole transmission equipment can be greatly improved. NF was 7.0 dB with the designed transmission equipment in which a buffer amplifier was not installed. In comparison with this, by setting the buffer amplifier, NF greatly improved with 4.9 dB or less. In additional, because the pumping light source of the buffer amplifier and the core amplifier can be common, economical transmission equipment can be obtained.

The present invention, when applied to an optical transmission system including terminal station repeaters and intermediate repeaters, makes it possible to provide an optical transmission device which is capable of performing a long haul transmission with a high reliability. Also, the present invention makes it possible to provide a long haul optical transmission system with high reliability.

In all embodiments described above, the relationship between the doped fiber and the pumping light sources does not limit the structures illustrated in the drawings. This is true even if the bi-directional pumping, backward pumping, or forward pumping is used.

While the present invention has been described in detail and pictorially in the accompanying drawings, it is not limited to such details since many changes and modification recognizable to these of ordinary skill in the art may be made to the invention without departing from the spirit and scope of the invention, and all such modifications as would be obvious to one skilled in the art are intended to be included within the scope of the following claims.

We claim:

1. An optical amplifier for amplifying an optical signal from an input line, said optical amplifier comprising:

a bi-directional coupler which is located between said input line and a doped fiber, said bi-directional coupler branches an optical signal from said input line to a first optical detector, and branches a reverse propagating light from said first optical detector to a second optical detector;

a pumping light source which emits a pumping light; and a wavelength multiplexer which introduces said pumping light to said doped fiber, wherein said doped fiber, which receives an attenuated signal light, amplifies the attenuated signal.

2. An optical amplifier according to claim 1, further comprising:

a control unit which controls output power of said pumping light source based upon information from said first optical detector.

* * * * *